US007016617B2

(12) United States Patent
Koike

(10) Patent No.: US 7,016,617 B2
(45) Date of Patent: Mar. 21, 2006

(54) INFORMATION DELIVERING SYSTEM, INFORMATION DELIVERING METHOD, AND COMPUTER PRODUCT

(75) Inventor: Takahisa Koike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 628 days.

(21) Appl. No.: 09/987,520

(22) Filed: Nov. 15, 2001

(65) Prior Publication Data

US 2002/0062304 A1 May 23, 2002

(30) Foreign Application Priority Data

Nov. 22, 2000 (JP) ............................ 2000-356641

(51) Int. Cl.
*G03G 15/00* (2006.01)
*G06F 17/60* (2006.01)
*H04N 1/00* (2006.01)

(52) U.S. Cl. ............................ 399/8; 358/1.15; 399/1; 399/79; 399/81; 705/14

(58) Field of Classification Search .................... 399/8, 399/1, 9, 10, 79, 81, 38; 358/1.15; 705/14, 705/16; 709/223
See application file for complete search history.

(56) References Cited

U.S. PATENT DOCUMENTS

| | | | | |
|---|---|---|---|---|
| 6,404,994 | B1 * | 6/2002 | Kawai et al. | 399/6 |
| 6,705,781 | B1 * | 3/2004 | Iwazaki | 358/1.15 X |
| 2002/0016972 | A1 * | 2/2002 | Ogawa et al. | 725/133 |
| 2002/0054324 | A1 * | 5/2002 | Okada et al. | 358/1.15 |
| 2002/0057451 | A1 * | 5/2002 | Ishijima | 358/1.15 |
| 2002/0063885 | A1 * | 5/2002 | Dutta | 358/1.15 |
| 2002/0080384 | A1 * | 6/2002 | Hobbs | 358/1.15 |

FOREIGN PATENT DOCUMENTS

| | | |
|---|---|---|
| JP | 6-164802 | 6/1994 |
| JP | 8-256256 | 10/1996 |
| JP | 9-212051 | 8/1997 |
| JP | 11-192760 | 7/1999 |
| JP | 11-355549 | 12/1999 |
| JP | 2000-59554 | 2/2000 |

* cited by examiner

*Primary Examiner*—Sophia S. Chen
(74) *Attorney, Agent, or Firm*—Oblon, Spivak, McClelland, Maier & Neustadt, P.C.

(57) ABSTRACT

The advertisement managing device receives an advertisement request from an advertisement client terminal. The customer managing device specifies a copying machine adapted to the advertisement request, and advertisement contents requested to be advertised are transmitted to the specified copying machine. When the advertisement managing device receives an estimation request, an estimation result inclusive of the approximation of an advertisement charge is returned to the advertisement client terminal.

16 Claims, 18 Drawing Sheets

400

| | |
|---|---|
| REQUEST NUMBER | |
| ADVERTISEMENT CLIENT | |
| ADVERTISEMENT | RENOVATED AND REOPENED |
| DESTINATION | 【ADDRESS】 NAKA-MAGOME, OHTA-KU, TOKYO TEL XX-XXXX |
| ADVERTISEMENT TYPE | PRINTING IN RED |
| ADVERTISEMENT RANGE | USERS LOCATED WITHIN RADIUS OF R KM AROUND X |
| MAXIMUM NUMBER OF SHEETS PER USER | 1,000 SHEETS |
| TOTAL MAXIMUM NUMBER OF SHEETS | 50,000 SHEETS |
| CONTRACT | |
| | |

| | COPING TYPE | POINT |
|---|---|---|
| A | COPYING ON USED SHEET | 1 |
| | COPYING ON NEW SHEET | 2 |
| B | COVER PAGE | 2 |
| | OTHER THAN COVER PAGE | 0.5 |
| C | STAPLING | 1.5 |

INFORMATION DELIVERING SYSTEM, INFORMATION DELIVERING METHOD, AND COMPUTER PRODUCT

FIELD OF THE INVENTION

The present invention relates to an information delivering system, an information delivering method and a computer product.

BACKGROUND OF THE INVENTION

In a copying machine, there has been known a system for notifying a centrally managing device disposed at the center of cumulative printing times, the residual amount of toner or the like, occurrence of a failure or the like, summarizing the use condition of the copying machine, or remotely diagnosing the copying machine by the use of a public telephone line network. For example, Japanese Patent Application Laid-Open No. 6-164802 discloses a managing system for an image forming apparatus for centrally managing data on a copying machine via a public line network.

In this way, the managing system serving as a peripheral device for such a copying machine has been satisfactorily improved in recent years, and therefore, there has appeared an information delivering system for delivering information such as an advertisement or news to the copying machine by the use of the managing system.

For example, Japanese Patent Application Laid-Open No. 2000-59554 ("first prior art") discloses an information delivering system configured such that information such as an advertisement or news stored in a managing device is periodically delivered to a copying machine, which then outputs the delivered information. According to the first prior art, the information such as an advertisement or news is periodically delivered to the copying machine by using a system to be normally used in remotely diagnosing the copying machine, and the information is displayed on a console panel of the copying machine during a copying operation, thereby preventing any dullness which a user may feel when the same advertisement is displayed all the time.

Furthermore, Japanese Patent Application Laid-Open No. 8-256256 ("second prior art") discloses an image forming system configured such that a copying machine is connected to an advertisement managing server via a network, and when the copying machine makes a request for an advertisement image added with the shape of a margin space of a document image, the advertisement managing server transmits an advertisement image having a shape much similar to the shape of the margin space to the copying machine. According to the second prior art, it is possible to offer the advertisement adapted to the margin space of the image of an original document to be copied.

However, since it is presumed that the information to be advertised is previously registered in the managing device in the conventional information advertisement system typified by the above-described First or Second Prior Art, it is unclear as to however the information to be advertised is registered in the managing device.

Consequently, an operator of the managing device must normally receive a command from an advertisement client so as to register the information to be advertised in the managing device every time, thereby arising a problem that the information to be advertised cannot be efficiently registered in the managing device. Moreover, there may arise a problem that if the advertisement client wants to advertise something at once, it is impossible to fulfill such needs of the advertisement client. Additionally, there may arise a problem that the above-described prior art cannot fulfill the needs of the advertisement client, for example, the area of a customer to which the advertisement client wants to direct the advertisement.

In view of this, it is remarkably important to speedily offer an advertisement to a customer with high efficiency in such a manner as to fulfill the needs of the advertisement client by the use of a system to be used for remotely managing the copying machine.

SUMMARY OF THE INVENTION

It is an object of the present invention to provide an information advertising system, an information advertising method and a computer-readable recording medium in which a program enabling a computer to execute the method is recorded, in which an advertisement can be speedily offered to a customer with high efficiency in such a manner as to fulfill the needs of an advertisement client by the use of a system to be used for remotely managing the copying machine.

The information delivering system according to one aspect of the present invention comprises, a plurality of copying machines and a managing device for managing the copying machines by the use of a managing database accumulating therein management information on each of the copying machines and outputs delivery information delivered from the managing device from the copying machine. The managing device comprises, a delivery request receiving unit which receives a delivery request for the delivery information from a delivery client terminal operated by an information delivery client, a specifying unit which specifies the copying machine adapted to the delivery request received by the delivery request receiving unit based on the management information accumulated in the managing database, and a delivery information transmitting unit which transmits the delivery information requested to be delivered to the copying machine specified by the specifying unit.

According to the above-mentioned aspect, the delivery request for the delivery information is received from the delivery client terminal to be operated by the delivery client requesting for the information, the copying machine adapted to the received delivery request is specified based on the management information accumulated in the managing database, and the delivery information requested to be delivered is transmitted to the specified copying machine. Consequently, the delivery fulfilling the needs of the delivery client can be speedily offered to a customer with high efficiency by using a system used for remotely managing the copying machine.

The information delivering system according to another aspect of the present invention comprises, a plurality of copying machines and a managing device for charging a user of each of the copying machines for a copying charge per predetermined period of time by the use of a managing database accumulating therein data relating to the number of copying sheets received by each of the copying machines together with management information for each of the copying machines and outputs delivery information delivered from the managing device from the copying machine. The managing device comprises, a delivery request receiving unit which receives a delivery request for the delivery information from a delivery client terminal operated by an information delivery client, a specifying unit which specifies the copying machine adapted to the delivery request received by the delivery request receiving unit based on the management information accumulated in the managing database, a delivery information transmitting unit which transmits the delivery information requested to be delivered to the copying machine specified by the specifying unit, a delivery charge calculating unit which calculates a delivery charge to be charged to the delivery client, and a charging unit which charges the delivery charge calculated by the delivery charge calculating unit in addition to the copying charge based on data relating to the number of copying sheets accumulated in the managing database.

According to the above-mentioned aspect, the managing device receives the delivery request for the delivery information from the delivery client terminal operated by the delivery client requesting for the information, specifies the copying machine adapted to the received delivery request based on the management information accumulated in the managing database, transmits the delivery information requested to be delivered to the specified copying machine, calculates the delivery charge charged to the delivery client, and charges the calculated delivery charge in addition to the copying charge based on the data relating to the number of copying sheets accumulated in the managing database. Consequently, the delivery charge can be efficiently charged by using the conventional system for charging the copying charge.

The information delivering method according to still another aspect of the invention in is realized on an information delivering system which includes a plurality of copying machines and a managing device for managing the copying machines by the use of a managing database accumulating therein management information on each of the copying machines and outputs delivery information delivered from the managing device from the copying machine. The managing device performs, a delivery request receiving step of receiving a delivery request for the delivery information from a delivery client terminal operated by an information delivery client, a specifying step of specifying the copying machine adapted to the delivery request received in the delivery request receiving step based on the management information accumulated in the managing database, and a delivery information transmitting step of transmitting the delivery information requested to be delivered to the copying machine specified in the specifying step.

According to the above-mentioned aspect, the delivery request for the delivery information is received from the delivery client terminal to be operated by the delivery client requesting for the information, the copying machine adapted to the received delivery request is specified based on the management information accumulated in the managing database, and the delivery information requested to be delivered is transmitted to the specified copying machine. Consequently, the delivery fulfilling the needs of the delivery client can be speedily offered to a customer with high efficiency by using a system used for remotely managing the copying machine.

The information delivering method according to still another aspect of this invention is realized on an information delivering system which includes a plurality of copying machines and a managing device for charging a user of each of the copying machines for a copying charge per predetermined period of time by the use of a managing database accumulating therein data relating to the number of copying sheets received by each of the copying machines together with management information for each of the copying machines and outputs delivery information delivered from the managing device from the copying machine. The managing device performs a delivery request receiving step of receiving a delivery request for the delivery information from a delivery client terminal operated by an information delivery client, a specifying step of specifying the copying machine adapted to the delivery request received in the delivery request receiving step based on the management information accumulated in the managing database, a delivery information transmitting step of transmitting the delivery information requested to be delivered to the copying machine specified in the specifying step, a delivery charge calculating step of calculating a delivery charge to be charged to the delivery client, and a charging step of charging the delivery charge calculated in the delivery charge calculating step in addition to the copying charge based on data relating to the number of copying sheets accumulated in the managing database.

According to the above-mentioned aspect, the managing device receives the delivery request for the delivery information from the delivery client terminal operated by the delivery client requesting for the information, specifies the copying machine adapted to the received delivery request based on the management information accumulated in the managing database, transmits the delivery information requested to be delivered to the specified copying machine, calculates the delivery charge charged to the delivery client, and charges the calculated delivery charge in addition to the copying charge based on the data relating to the number of copying sheets accumulated in the managing database. Consequently, the delivery charge can be efficiently charged by using the conventional system for charging the copying charge.

The computer program according to this invention, that contains instructions which when executed on the computer enables the computer realize the method according to any one of the above-mentioned aspects on the computer.

Other objects and features of this invention will become apparent from the following description with reference to the accompanying drawings.

DETAILED DESCRIPTION

Embodiments of an information delivering system, an information delivering method and a computer-readable recording medium according to the present invention will be explained in detail while referring to the accompanying drawings. Incidentally, the present invention is applied to an information advertising system in the embodiments.

Figure 1:
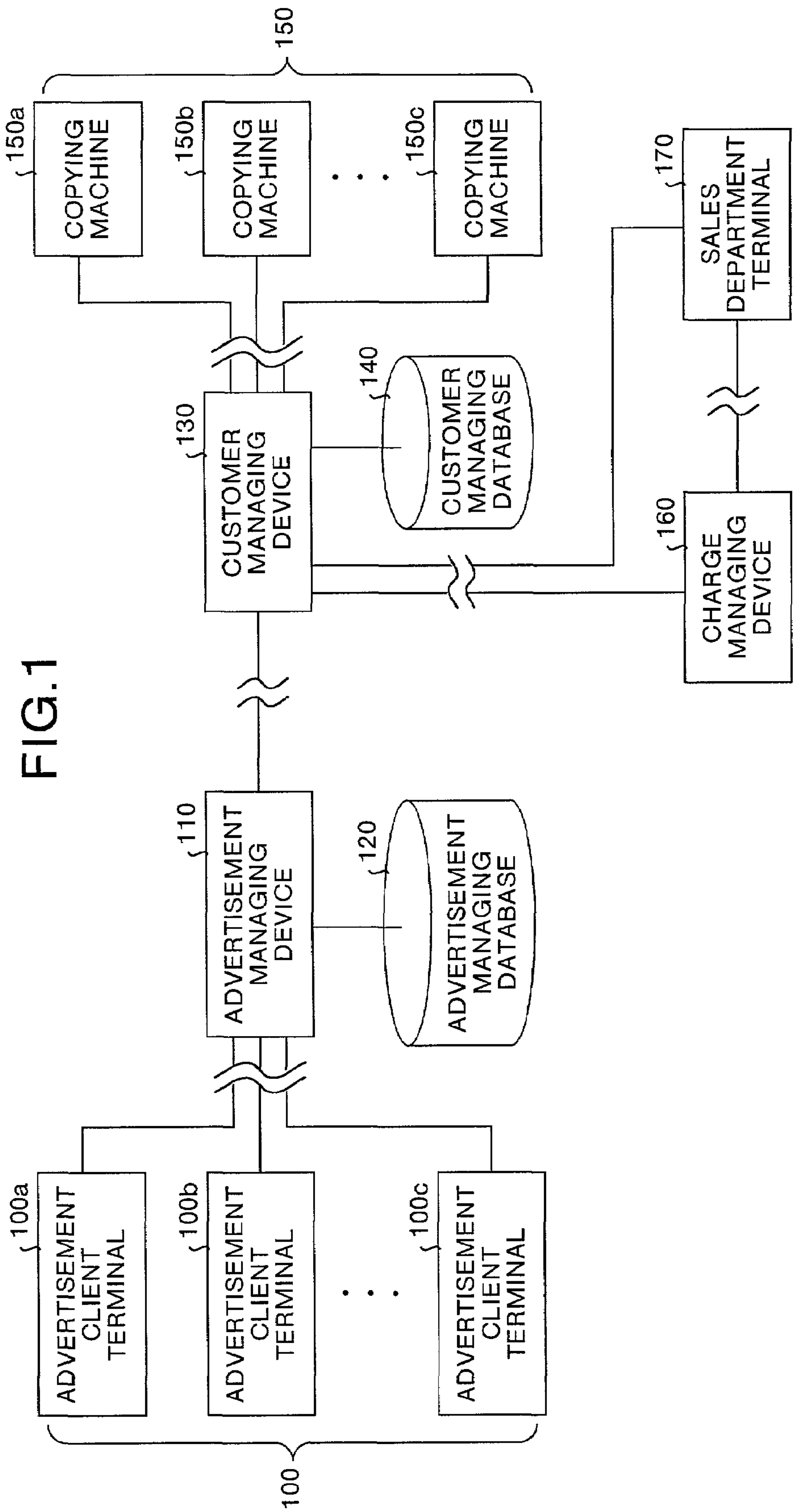
FIG. 1 is a diagram showing the configuration of an information advertising system in a first embodiment according to the present invention.

The configuration of an information advertising system according to a first embodiment will be explained. FIG. 1 is a diagram showing the configuration of the information advertising system in the first embodiment. The information advertising system shown in FIG. 1 comprises advertisement client terminals 100*a* to 100*c* possessed by advertisement clients (hereinafter generally referred to as "an advertisement client terminal 100"), an advertisement managing device 110 having an advertisement managing database 120, a customer managing device 130 having a customer managing database 140, copying machines 150*a* to 150*c* possessed by customers (hereinafter generally referred to as "a copying machine 150"), a charge managing device 160, and a sales department terminal 170 possessed by a sales department, in which all of these components are connected to each other over a public line network.

The copying machine 150, the customer managing device 130, the charge managing device 160 and the sales department terminal 170 are the same as those in a conventional remote managing system. The customer managing database 140 stores therein the installation position of each of the copying machines 150*a* to 150*c*, the location of a user who uses each of the copying machines, the type of component parts constituting each of the copying machines and the like in the same manner as conventional. The installation position of the copying machine and the location of the user are expressed by, for example, a municipal name, an address or the like, and the type of component parts constituting the copying machine signifies color correspondence or monochromatic correspondence in a printer unit or a scanner unit.

The number of sheets copied by each of the copying machines 150*a* to 150*c* is notified to the customer managing device 130 from each of the copying machines 150*a* to 150*c* per predetermined period of time, and then, is managed by the customer managing database 140. Furthermore, a customer of each of the copying machines 150*a* to 150*c* is charged for a copying charge for the number of sheets via the charge managing device 160.

If a failure occurs in any of the copying machines 150, the occurrence of a failure is automatically alarmed to the customer managing device 130 over the public line network. At this time, the customer managing device 130 tries to overcome the failure by a remote control. Unless the customer managing device 130 can overcome the failure by the remote control, the sales department terminal 170 is notified of the impossibility of the remote control together with the installation position of the copying machine 150, and then, instructs a service person to visit the customer.

The information advertising system herein is not the conventional remote managing system per se, but is configured to have the improved functions of the component parts in the conventional remote managing system and be additionally provided with the advertisement client terminal 100 and the advertisement managing device 110.

The advertisement client terminal 100 is a terminal device possessed by the advertisement client who requests that an advertisement should be published in the copying machine 150. Specifically, the advertisement client requests the advertisement managing device 110 for an advertisement or estimation via the advertisement client terminal 100.

The advertisement managing device 110 is a device for receiving a request for an advertisement or estimation from each of the advertisement client terminals 100. Specifically, upon receipt of the request for estimation from the advertisement client terminal 100*a*, the advertisement managing device 110 approximates an advertisement charge required for the advertisement, and then, returns the estimation result including the advertisement charge to the advertisement client terminal 100*a*. Such estimation can offer an efficient advertisement within a budget which the advertisement client expects, and further restrict an advertisement area according to the advertisement result, or change color printing of the advertisement to monochromatic printing. Moreover, upon receipt of the request for an advertisement from the advertisement client terminal 100*a*, the advertisement managing device 110 registers the advertisement request in the advertisement managing database 120 and transfers it to the customer managing device 130.

The customer managing device 130 creates advertisement data for each of the copying machines (i.e., for each of the customers) based on the advertisement request received from the advertisement managing device 110 and stores the advertisement data in the customer managing database 140, and then, delivers the advertisement data to each of the copying machines 150. Specifically, when a regional name such as "A Town" is designated as a delivery area of the advertisement request when the customer managing device 130 creates the advertisement data, the copying machine 150 installed within the delivery area or the copying machine 150 whose customer is located within the delivery area is retrieved from the customer managing database 140, and thus, the retrieved copying machine 150 is specified as a copying machine to which the advertisement data is to be delivered.

When the output color of the advertisement is designated by a message of, for example, "print in red", the copying machine 150 capable of printing in red is retrieved from the customer managing database 140, and thus, the retrieved copying machine 150 is specified as a copying machine to which the advertisement data is to be delivered. Furthermore, in the case where the delivery area and the output color are designated by the messages of "A Town" and "print in red", respectively, the copying machine 150 which can fulfill both of the conditions is retrieved from the customer managing database 140, and thus, the retrieved copying machine 150 is specified as a copying machine to which the advertisement data is to be delivered.

After the copying machine 150 to which the advertisement data is to be delivered is specified for each of the advertisement requests, the advertisement requests are collated for each of the copying machines 150, and then, the advertisement data for each of the copying machines 150 is created.

Upon receipt of the estimation request in the advertisement managing device 110, the customer managing device 130 calculates and estimates the charge of the advertisement by using the installation position of each of the copying machines 150, the location of the customer of the copying machine 150, the type of component parts constituting the copying machine 150 and the like, which all are stored in the customer managing database 140.

In forming an image of a document read by the scanner section on a printing sheet, the copying machine 150 prints also the advertisement data received from the customer managing device 130 at the margin or the like of the printing sheet. Moreover, the advertisement data received from the customer managing device 130 during a copying operation can also be displayed on a console panel.

The charge managing device 160 is a managing device for managing a copying charge for the number of sheets copied by each of the customers by the use of the copying machine 150 and the advertisement charge required for the advertisement requested by the advertisement client, so as to notify the sales department terminal 170 of the charge to the customer of each of the copying machines 150 or the advertisement client. That is to say, although the customer is charged for the copying charge in the conventional charge managing device 160, not only the advertisement charge but also the copying charge can be charged in the present system.

The sales department terminal 170 is a terminal device possessed by the sales department, and sends a service person to the customer in the case where a trouble occurs in the copying machine 150. Moreover, a service person may visit the customer or the advertisement client to collect the copying charge or the advertisement charge received from the charge managing device 160.

Figure 2:
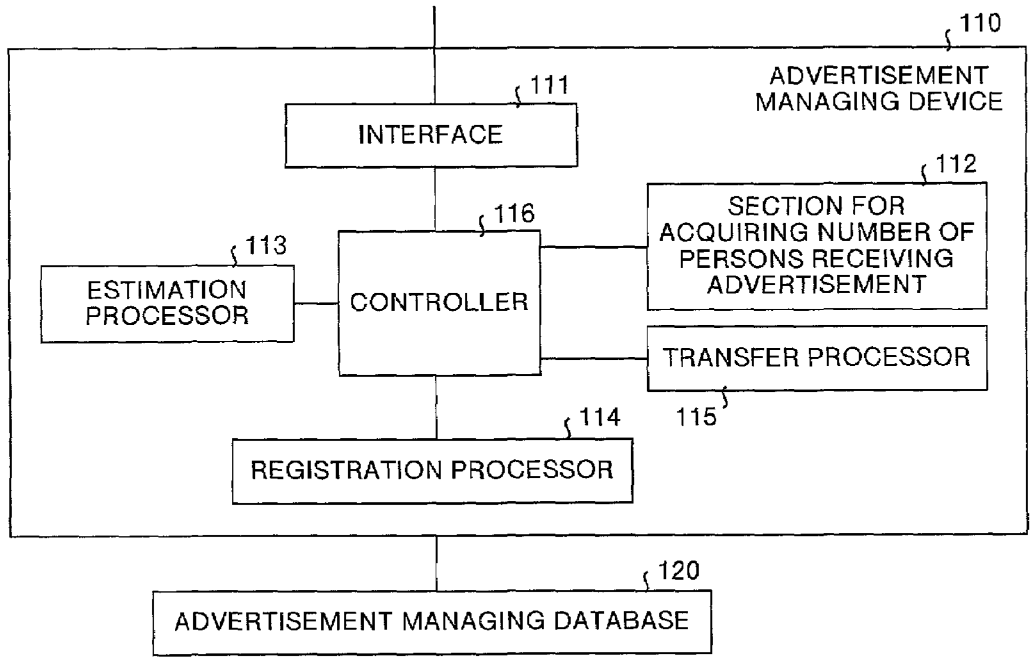
FIG. 2 is a functional block diagram showing the configuration of an advertisement managing device shown in FIG. 1.

Next, a specific explanation will be made on the configuration of the advertisement managing device 110 shown in FIG. 1. FIG. 2 is a functional block diagram showing the configuration of the advertisement managing device 110 shown in FIG. 1. As shown in FIG. 2, the advertisement managing device 110 comprises an interface 111, a section for acquiring the number of persons receiving an advertisement 112, an estimation processor 113, a registration processor 114, a transfer processor 115 and a controller 116.

The interface 111 is an interface for transmitting or receiving data between the advertisement client terminal 100 and the customer managing device 130 over the public line network. The section for acquiring the number of persons receiving an advertisement 112 is a processor for acquiring the number of persons receiving an advertisement corresponding to the estimation request from the customer managing device 130 upon receipt of the estimation request from the advertisement client terminal 100.

The estimation processor 113 is a processor for making the estimation result including the approximation of the advertisement charge based on the advertisement condition included in the estimation request received from the advertisement client terminal 100 and the number of persons receiving an advertisement acquired from the customer managing device 130, and then, returns the estimation result to the advertisement client terminal 100 possessed by the client.

The registration processor 114 is a processor for registering the advertisement request in the advertisement managing database 120 upon receipt of the advertisement request from the advertisement client terminal 100. The transfer processor 115 is a processor for transferring the advertisement request to the customer managing device 130 upon receipt of the advertisement request from the advertisement client terminal 100, and the controller 116 is a controller for controlling the entire advertisement managing device 110.

Figure 3:
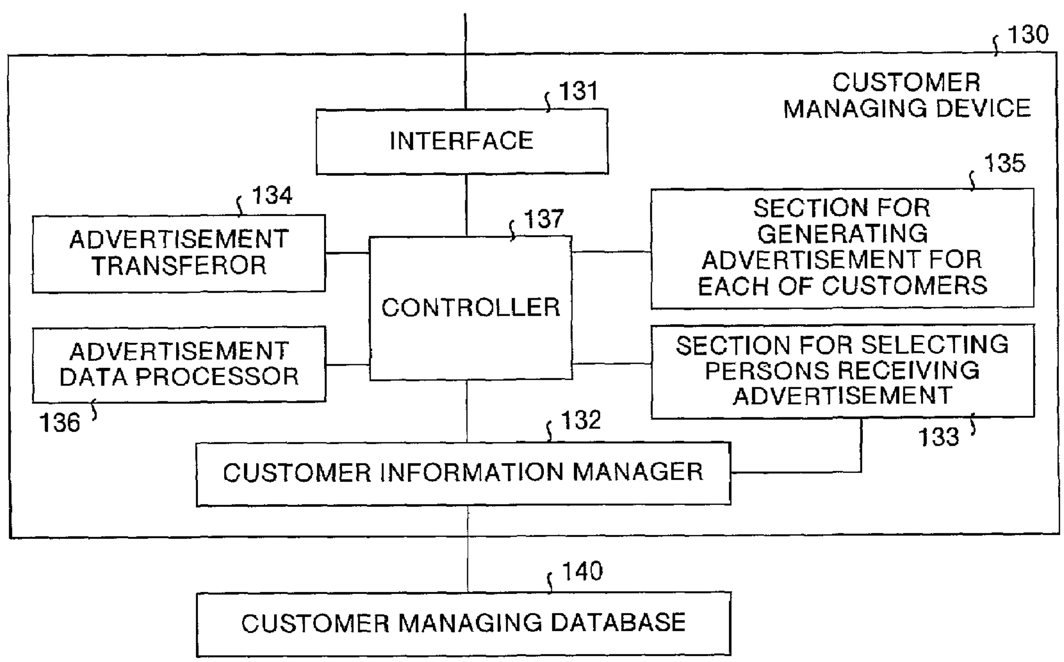
FIG. 3 is a functional block diagram showing the configuration of a customer managing device shown in FIG. 1, FIG. 4A and FIG. 4B show one example of an advertisement request made by an advertisement client terminal shown in FIG. 1.

Subsequently, explanation will be made on the configuration of the customer managing device 130 shown in FIG. 1. FIG. 3 is a functional block diagram showing the configuration of the customer managing device 130 shown in FIG. 1. The customer managing device 130 shown in FIG. 3 is a device based on a managing device which has been conventionally provided for managing each of the copying machines 150 by the use of the managing database, which is used here as the customer managing database 140.

As shown in FIG. 3, the customer managing device 130 comprises an interface 131, a customer information manager 132, a section for selecting persons receiving an advertisement 133, an advertisement transferor 134, a section for generating an advertisement for each of customers 135, an advertisement data processor 136 and a controller 137.

The interface 131 is an interface for transmitting or receiving data among the advertisement managing device 110, the copying machines 150, the charge managing device 160 and the sales department terminal 170 over the public line network.

The customer information manager 132 is a manager for managing information on each of the copying machines 150 by the use of the customer managing database 140. Specifically, the customer information manager 132 stores constituent information on the installation position of each of the copying machines 150, the location of the customer who uses each of the copying machines 150, the type of component parts constituting each of the copying machines or the like in the customer managing database 140, and then, manages the constituent information. Furthermore, the customer information manager 132 stores setting information indicating whether or not each of the copying machines 150 copies the advertisement or advertisement data on each of the copying machines 150 in the customer managing database 140, and then, manages the setting information or the advertisement data. The customer information manager 132 includes, for example, information on whether the copying machine 150 has a monochromatic printer or a color printer as the constituent information.

The section for selecting the number of persons receiving the advertisement 133 is a processor for selecting the copying machine of a person receiving the advertisement, who is adapted to the advertisement request, upon receipt of the advertisement request including the advertisement condition such as the area to which the advertisement is directed or the type of advertisement. Specifically, the section for selecting the persons receiving the advertisement 133 selects the copying machine 150 to which the advertisement is directed based on whether or not the advertisement is copied by each of the copying machines 150 managed by the customer information manager 132, the constituent information on each of the copying machines 150, the installation position of each of the copying machines 150, the location of the customer or the like. Moreover, upon receipt of the estimation request from the advertisement client terminal 100, the advertisement managing device 110 specifies the persons receiving the advertisement as a support for the estimation in the same procedures as those in the case of the advertisement request, and then, returns the number of persons receiving the advertisement to the advertisement managing device 110.

The section for generating the advertisement for each of the customers 135 is a processor for generating the advertisement data indicating the advertisement for each of the customers, i.e., for each of the copying machines upon receipt of the advertisement request from a plurality of advertisement clients via the advertisement managing device 110. The advertisement transferor 134 is a processor for transferring the advertisement data generated by the section for generating the advertisement for each of the customers 135 to each of the copying machines 150.

The advertisement data processor 136 is a processor for performing the processing relating to the advertisement data. Specifically, upon receipt of data on the number of sheets of the advertisement to be copied from each of the copying machines 150, the advertisement data processor 136 notifies the charge managing device 160 of the number of sheets of the advertisement to be copied. The controller 137 is a controller for performing the entire control of the customer managing device 130.

Figures 4A, 4B:
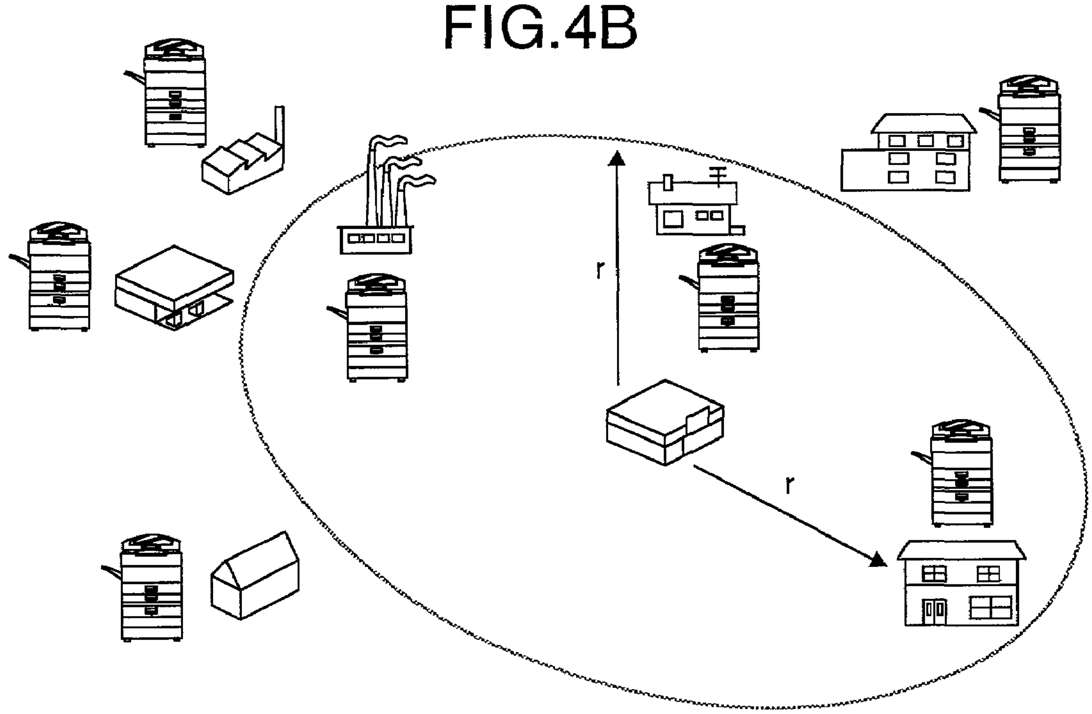

Next, explanation will be made on one example of the advertisement request by the advertisement client terminal 100 shown in FIG. 1. FIG. 4A and FIG. 4B show one example of the advertisement request via the advertisement client terminal 100 shown in FIG. 1. As shown in FIG. 4A, advertisement request data 400 includes items such as a request number, an advertisement client, an advertisement, a destination, an advertisement type, an advertisement range, the maximum number of sheets per user, the total maximum number of sheets and contract.

In the above explanation, the advertisement type signifies the printing condition such as "print in red" or "print in black", and the advertisement range designates a region such as "users located within a radius of r km around X" or "Naka-magome, Ohta-ku, Tokyo".

If the advertisement range of "users located within a radius of r km around X" is designated, the advertisement data is delivered to only the copying machines located within the radius around a certain point, as shown in FIG. 4B. Specifically, since the installation position of each of the copying machines 150 and the location of the customer who uses each of the copying machines 150 are stored in the customer managing database 140, as explained already, the copying machines 150 installed within the radius of r km around the certain point or the copying machines 150 possessed by the customers located within the range are compared with the advertisement range, thus specifying the copying machines to which the advertisement is to be directed. For example a distance between the center point and each copying machine is obtained, and a determination is made about whether or not the distance is within the radius r km, so that the copying machine belonging to the advertisement range can easily be specified.

Moreover, since the constituent information on each of the copying machines 150 is stored per copying machine in the customer managing database 140, the copying machine 150 having a printer capable of color printing is compared with the contents of the customer managing database 140 in specifying the copying machine adaptable to the printing condition such as "print in red", thus specifying the copying machine 150 to which the advertisement is to be directed.

Figure 5:
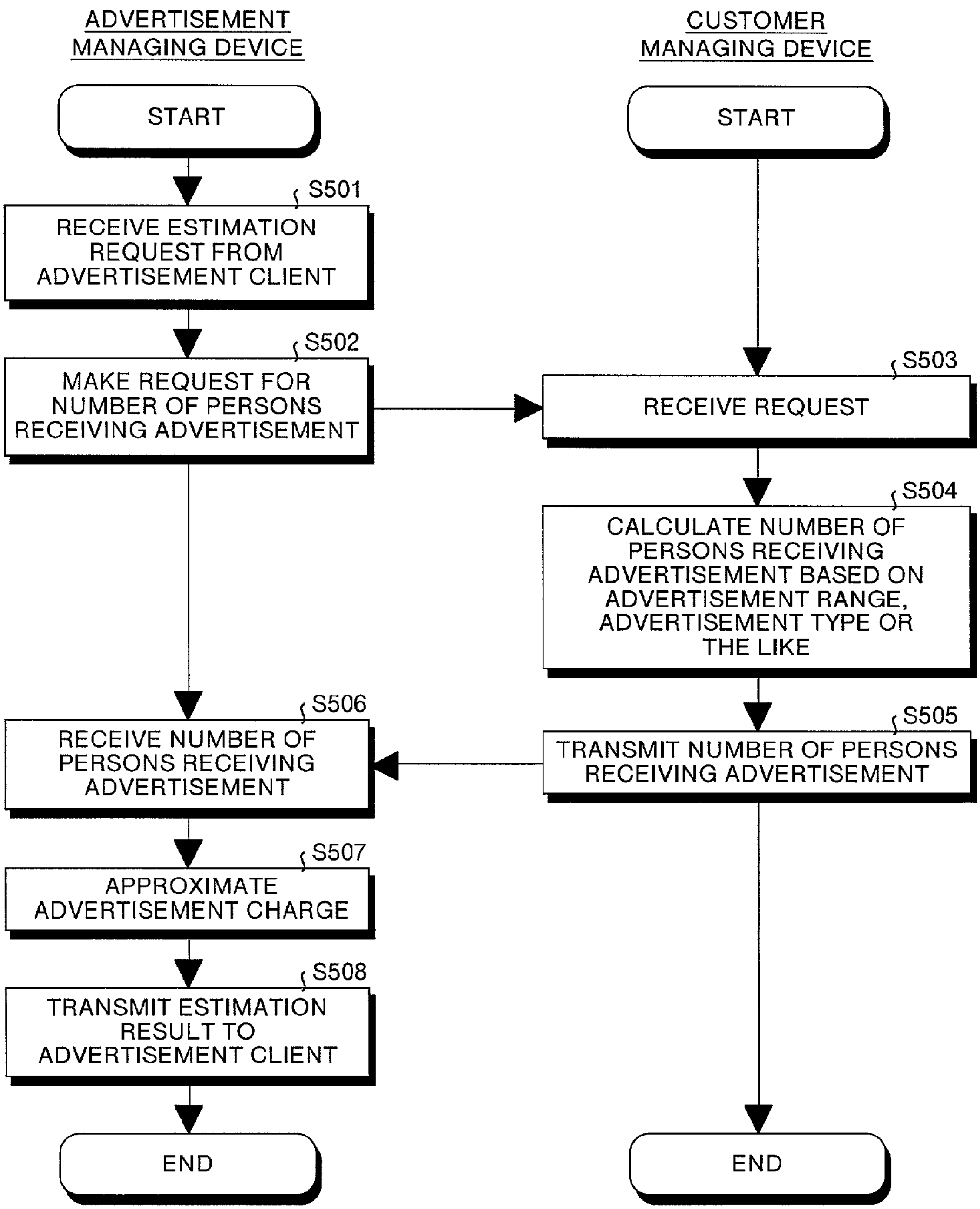
FIG. 5 is a flowchart showing the processing sequence when the advertisement managing device and the customer managing device, both of which are shown in FIG. 1, receive an estimation request.

Subsequently, explanation will be made below on the processing sequence when the advertisement managing device 110 and the customer managing device 130, both of which are shown in FIG. 1, receive the estimation request. FIG. 5 is a flowchart showing the processing sequence when the advertisement managing device 110 and the customer managing device 130, shown in FIG. 1, receive the estimation request.

As shown in FIG. 5, when the advertisement managing device 110 receives the estimation request from the advertisement client (step S501), it makes a request for the number of persons receiving the advertisement to the customer managing device 130 (step S502).

When the customer managing device 130 receives the request (step S503), it calculates the number of persons receiving the advertisement based on the advertisement range, the advertisement type or the like (step S504), and then, transmits the calculated number of persons receiving the advertisement to the advertisement managing device 110 (step S505).

When the advertisement managing device 110 receives the number of persons receiving the advertisement (step S506) it approximates the advertisement charge based on the number of persons receiving the advertisement, the maximum number of sheets per user, a copying charge of the advertisement per sheet or the like (step S507), and then, transmits the estimation result including the approximated advertisement charge to the advertisement client (step S508).

Figure 6:
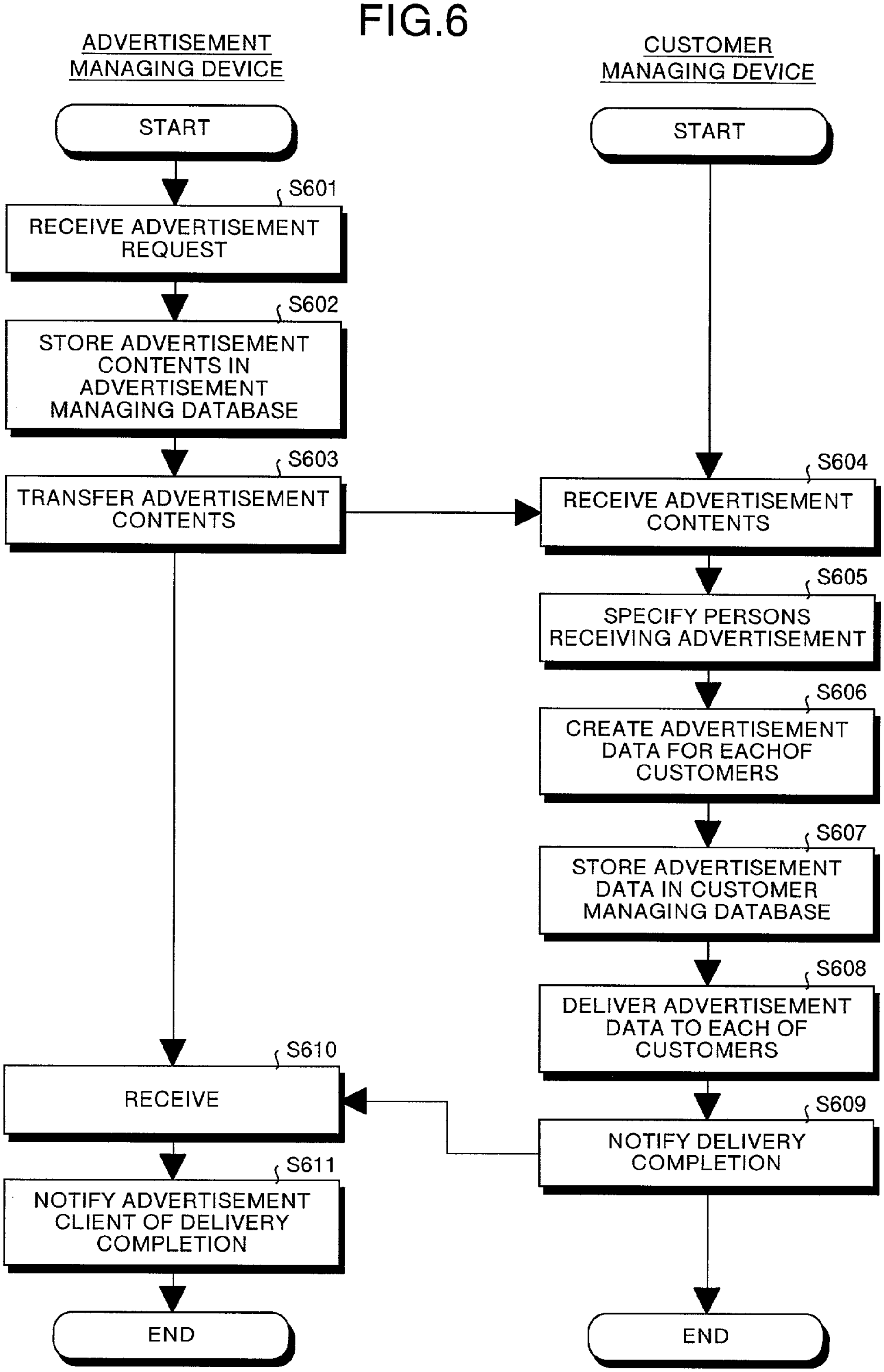
FIG. 6 is a flowchart showing the processing sequence when the advertisement managing device and the customer managing device, both of which are shown in FIG. 1, receive an advertisement request.

Subsequently, explanation will be made below on the processing sequence when the advertisement managing device 110 and the customer managing device 130, both of which are shown in FIG. 1, receive the advertisement request. FIG. 6 is a flowchart showing the processing sequence when the advertisement managing device 110 and the customer managing device 130, both of which are shown in FIG. 1, receive the advertisement request.

As shown in FIG. 6, when the advertisement managing device 110 receives the advertisement request (step S601), it stores the advertisement in the advertisement managing database 120 (step S602), and then, transfers the advertisement to the customer managing device 130 (step S603).

When the customer managing device 130 receives the advertisement (step S604), it specifies the persons receiving the advertisement in the same manner as the case of the estimation request (step S605), and then, creates the advertisement data for each of the customers (step S606) After the customer managing device 130 stores the advertisement data in the customer managing database 140 (step S607), it delivers the advertisement data to each of the customers, i.e., each of the copying machines 150 (step S608).

Thereafter, when the advertisement managing device 110 receives the notification of delivery completion given by the customer managing device 130 (steps S609 and S610), it notifies the corresponding advertisement client terminal 100 of the delivery completion (step S611).

Figure 7:
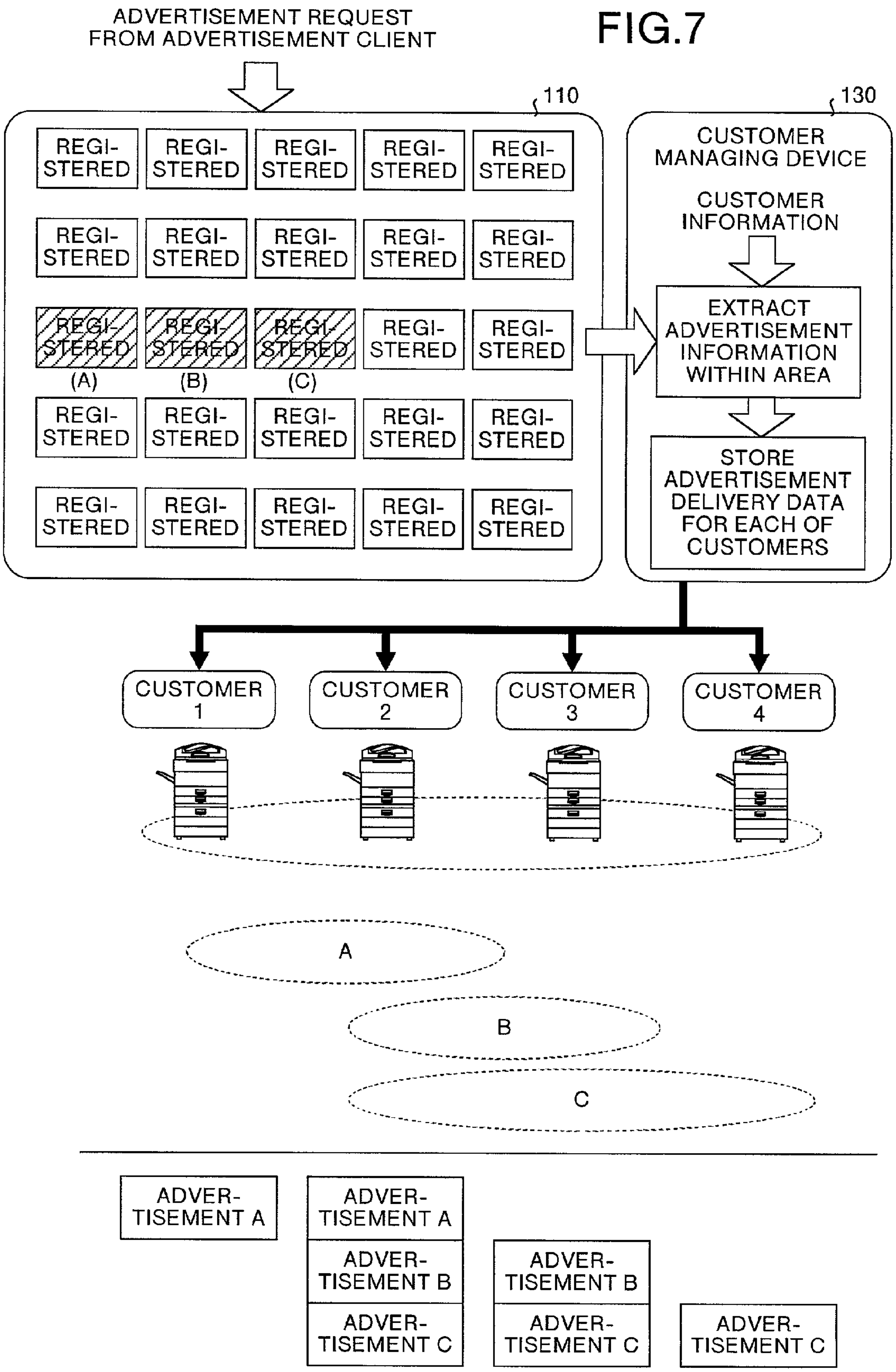
FIG. 7 shows the concept of creation of advertisement data for each of customers in step S606 of FIG. 6.

FIG. 7 shows the concept of creation of the advertisement data for each of the customers in step S606 of FIG. 6. As shown in FIG. 7, with respect to advertisement requests A, B and C registered in the advertisement managing device 110, the customer managing device 130 creates the advertisement data for each of the customers based on the advertisement and the customer information.

For example, in the case where the copying machines of both of a customer 1 and a customer 2 are present within an advertisement area designated by the advertisement request A, the copying machines of both of the customer 2 and a customer 3 are present within an advertisement area designated by the advertisement request B and the copying machines of all of the customers 2 and 3 and a customer 4 are present within an advertisement area designated by the advertisement request C, only the advertisement request A is included in the advertisement data in the copying machine of the customer 1, the advertisement requests A, B and C are included in the advertisement data in the copying machine of the customer 2, and the advertisement requests B and C are included in the advertisement data in the copying machine of the customer 3, and only the advertisement request C is included in the advertisement data in the copying machine of the customer 4.

In this manner, the advertisement data is created for each of the customers (i.e., for each of the copying machines) Although the explanation has been made on the case where only the advertisement area is considered for the sake of convenience, a similar process is performed under other additional advertisement conditions.

Figure 8:
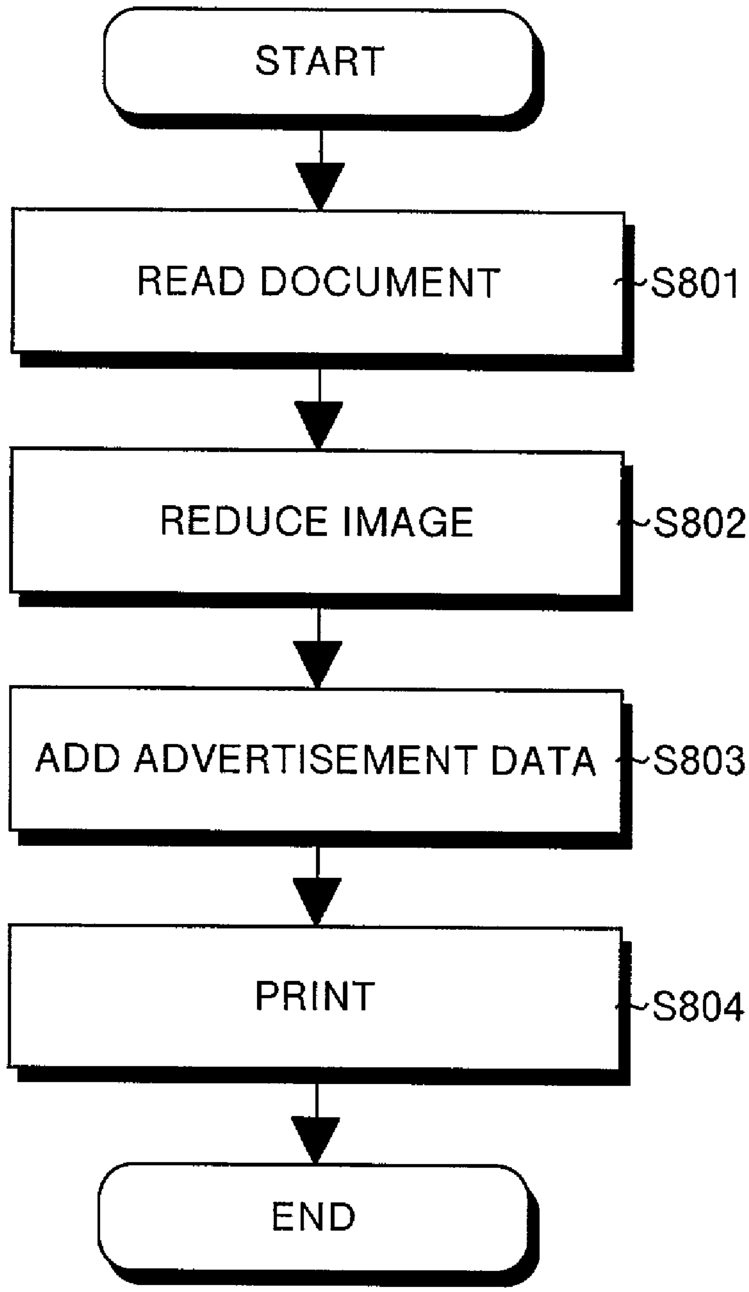
FIG. 8 is a flowchart showing the processing sequence by a copying machine shown in FIG. 1.

Next, a description will be given of the processing sequence of the copying machine 150 shown in FIG. 1. FIG. 8 is a flowchart showing the processing sequence of the copying machine 150 shown in FIG. 1. Here, the copying machine 150 permits the advertisement to be copied.

As shown in FIG. 8, when the copying machine 150 reads the document to be copied by a scanner unit (step S801), it reduces image data (step S802), adds the advertisement data received from the customer managing device 130 to a margin so as to synthesize the image data (step S803), and then, prints the synthesized image (step S804).

Figure 9:
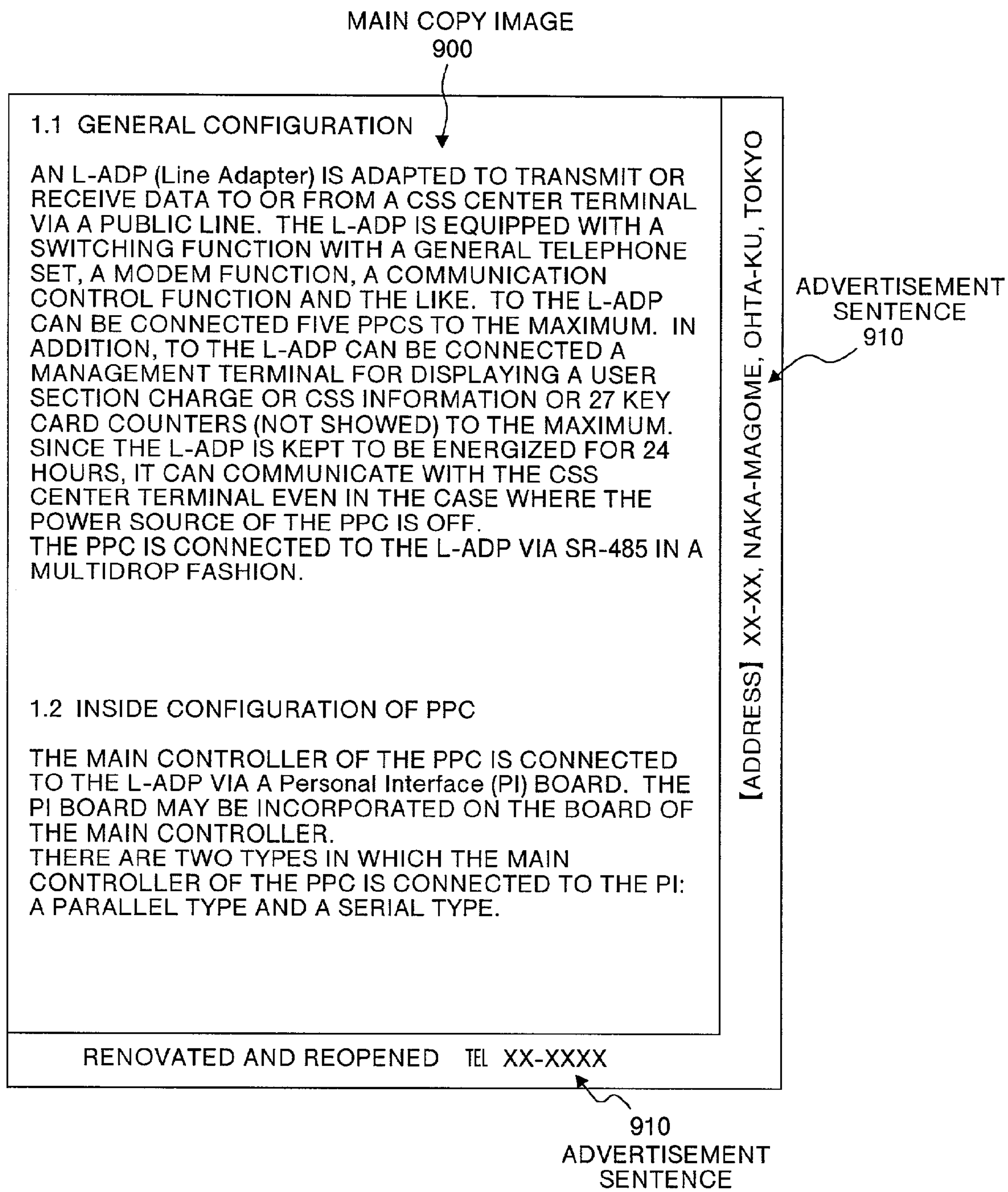
FIG. 9 shows one example of a printout printed by the copying machine shown in FIG. 1.

FIG. 9 shows one example of a printout printed by the copying machine 150 shown in FIG. 1. As shown in FIG. 9, an advertisement sentence 910 is printed at the lower and right margins of a main copy image 900.

The advertisement sentence 910 need not always be printed at the showed margins, but it may be printed at only a lower margin, only a right margin or only a left margin. Furthermore, the advertisement sentence 910 may be printed in color.

As described above, the information advertising system in the first embodiment is configured such that when the advertisement managing device 110 receives the advertisement request from the advertisement client terminal 100, the customer managing device 130 specifies the copying machines 150 adapted to the advertisement request, and then, the requested advertisement is transmitted to the specified copying machines 150. Consequently, it is possible to speedily offer, to the customer, the advertisement fulfilling the needs of the advertisement client with high efficiency by using the system used for remotely controlling the copying machine 150.

Incidentally, the first embodiment exemplifies the case where the copying machine 150 manages only the number of sheets to be copied, transmits the number of sheets to be copied to the customer managing device 130 on a closing day, and thus, the customer managing device 130 transfers the number of sheets to be copied to the charge managing device 160. However, points may be managed in place of the number of sheets to be copied.

Figure 10:
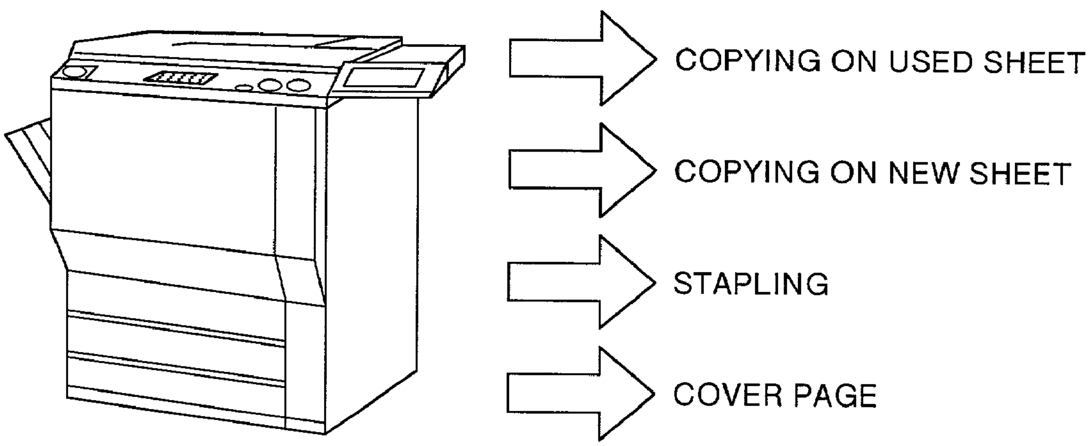
FIG. 10 shows an example in which the copying result of the advertisement is managed by the use of points in the copying machine shown in FIG. 1.

FIG. 10 shows an example in which the result of the copied advertisement by the use of points in the copying machine 150 shown in FIG. 1. As shown in FIG. 10, there are many cases where used sheets are used, new sheets are used or sheets are stapled when the copying machine 150 prints. The advertisement effect is different in each of the cases. The advertisement effect in the case where the advertisement is printed on a cover page is more remarkable than that in the case where the advertisement is printed on a page other than the cover page.

Therefore, the information advertising system may be configured such that points are added as follows, 1 point in the case of copying on a used sheet, 2 points in the case of copying on a new sheet, 2 points in the case of copying on a cover page, 0.5 point in the case of copying on a page other than a cover page and 1 point in the case of stapling, and the copying machine 150 sums up the points.

In this case, the copying machine 150 transmits the cumulative points to the customer managing device 130 on a closing day, so that the customer managing device 130 transfers the cumulative points to the charge managing device 160, and thus, charges the charge for the advertisement or the copy to the advertisement client or the customer based on the cumulative points.

In the first embodiment, only the requested advertisement is output onto the coping machine 150 at the time of the advertisement request from the advertisement client terminal 100. It is needless to say, that a bar code can be output together with the advertisement. A second embodiment according to the present invention exemplifies the case in which a bar code is output together with the requested advertisement.

Figure 11:
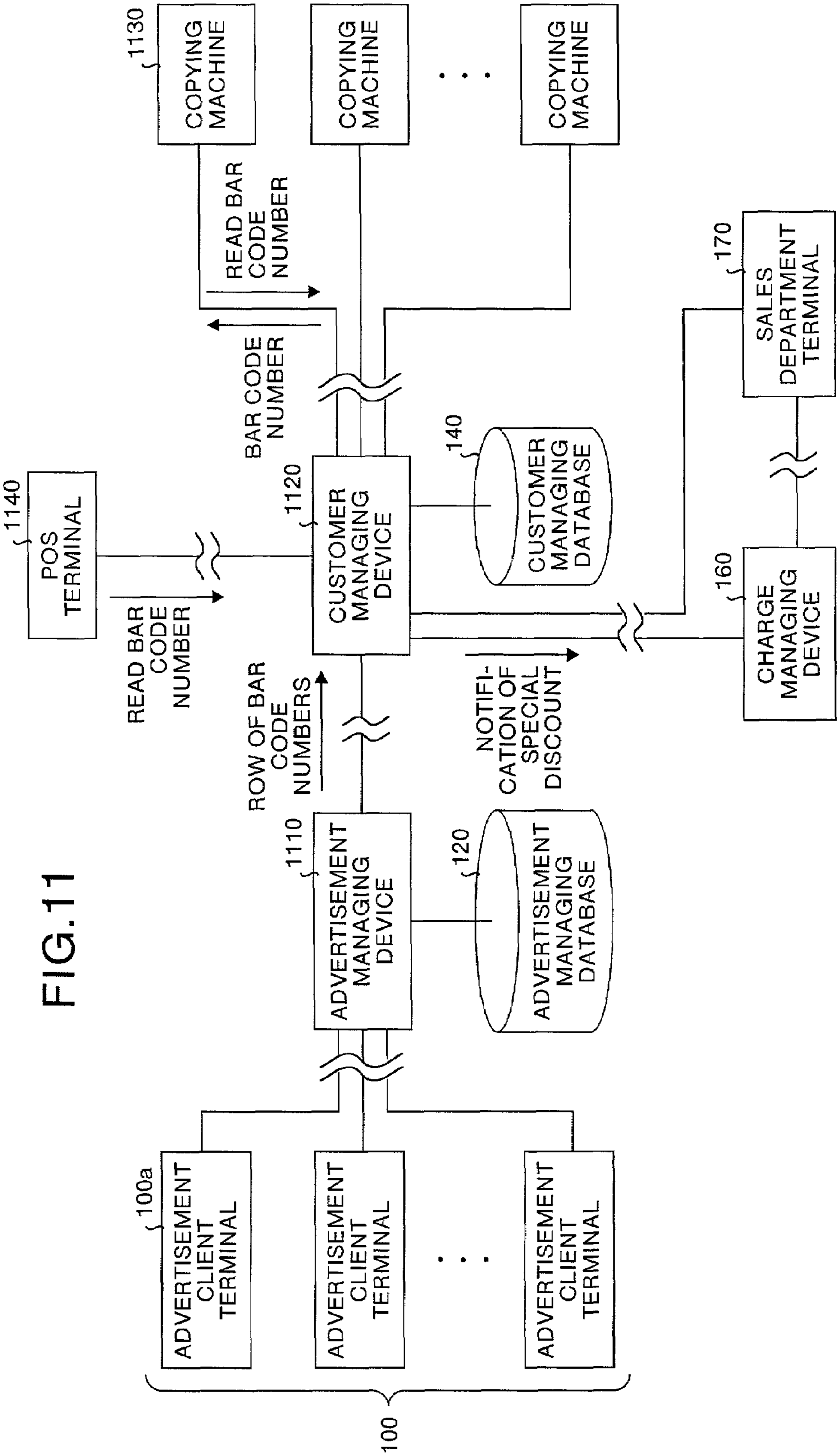
FIG. 11 is a diagram showing the configuration of an information advertising system in a second embodiment.
Figure 12:
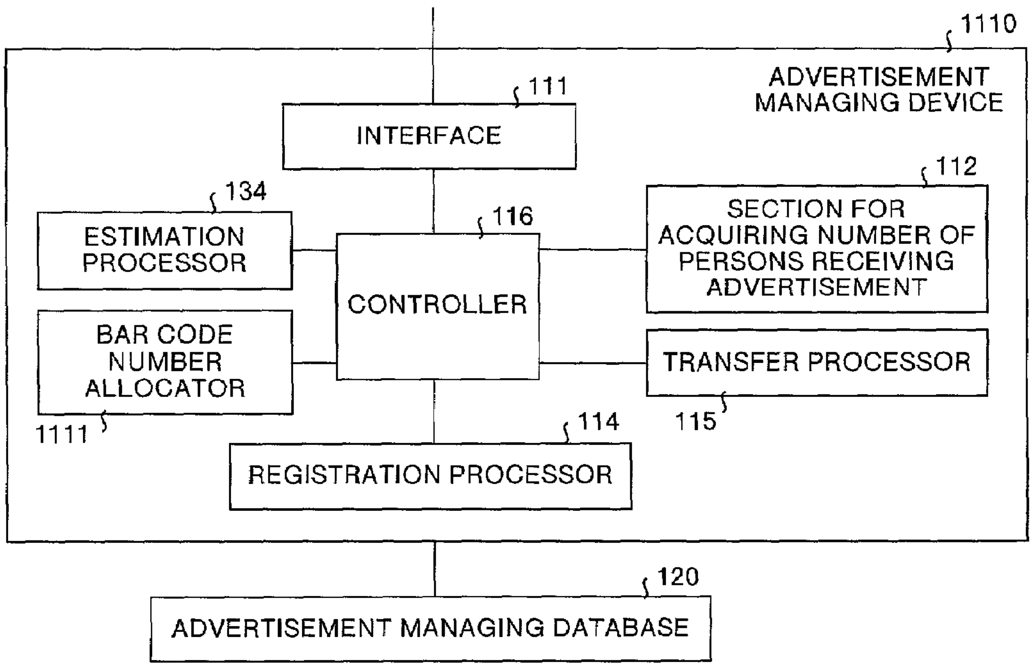
FIG. 12 is a block diagram showing the configuration of an advertisement managing device shown in FIG. 11.
Figure 13:
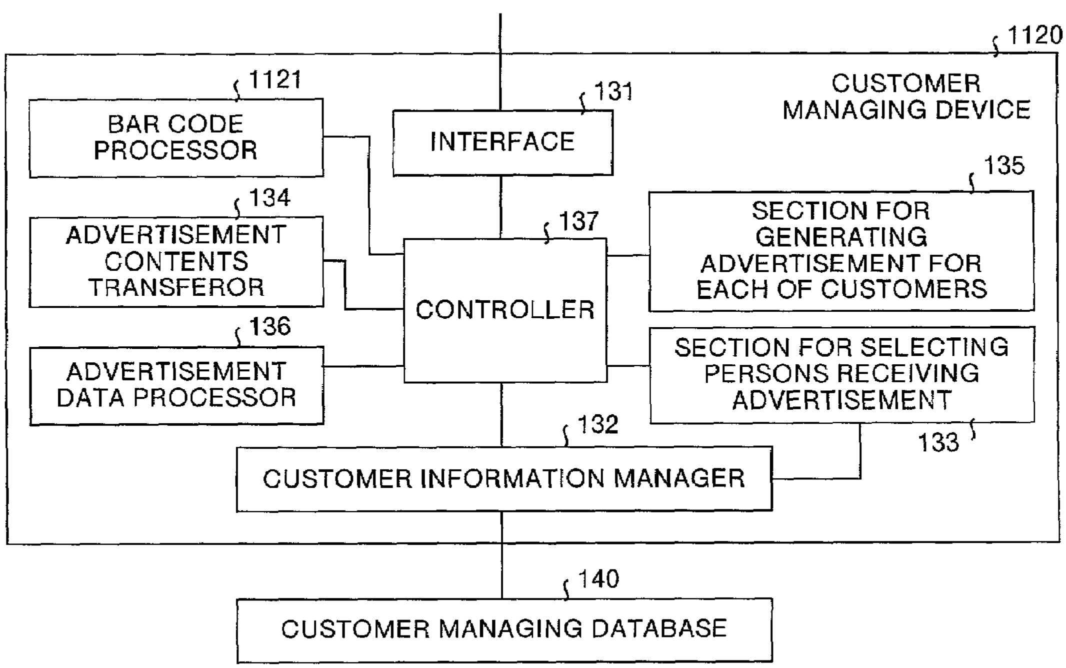
FIG. 13 is a block diagram showing the configuration of a customer managing device shown in FIG. 11.

FIG. 11 is a diagram showing the configuration of an information advertising system in the second embodiment, FIG. 12 is a block diagram showing the configuration of an advertisement managing device 1110 shown in FIG. 11, and FIG. 13 is a block diagram showing the configuration of a customer managing device 1120 shown in FIG. 11. Here, constituents having the same functions as those of the constituents shown in FIG. 1 to FIG. 3 are designated by the same reference numerals, and therefore, their detailed descriptions will be omitted below.

As shown in FIG. 11, this information advertising system is configured in the same manner as that shown in FIG. 1, with the exception that the advertisement managing device 1110, the customer managing device 1120 and a copying machine 1130 are additionally equipped with a function relating to a bar code and the information advertising system is provided with a POS terminal 1140 for reading the bar code.

As shown in FIG. 12, the advertisement managing device 1110 includes a bar code number allocator 1111 for allocating a bar code number to an advertisement request upon receipt of the advertisement request from an advertisement client terminal 100. A bar code number allocated by the bar code number allocator 1111 is stored in an advertisement managing database 120 together with the advertisement request, and further, is transmitted to the customer managing device 1120.

As shown in FIG. 13, the customer managing device 1120 includes a bar code processor 1121 for performing the processing relating to the bar code. The customer managing device 1120 delivers the bar code number to the copying machine 1130 together with advertisement data upon receipt of the bar code number from the advertisement managing device 1110. The bar code processor 1121 gives the notification of a special discount to a charge managing device 160 based on a read bar code number upon receipt of the read bar code number from the copying machine 1130.

The copying machine 1130 prints a bar code pattern corresponding to the bar code number on a printing sheet together with the advertisement upon receipt of the bar code number from the customer managing device 1120.

Figure 14:
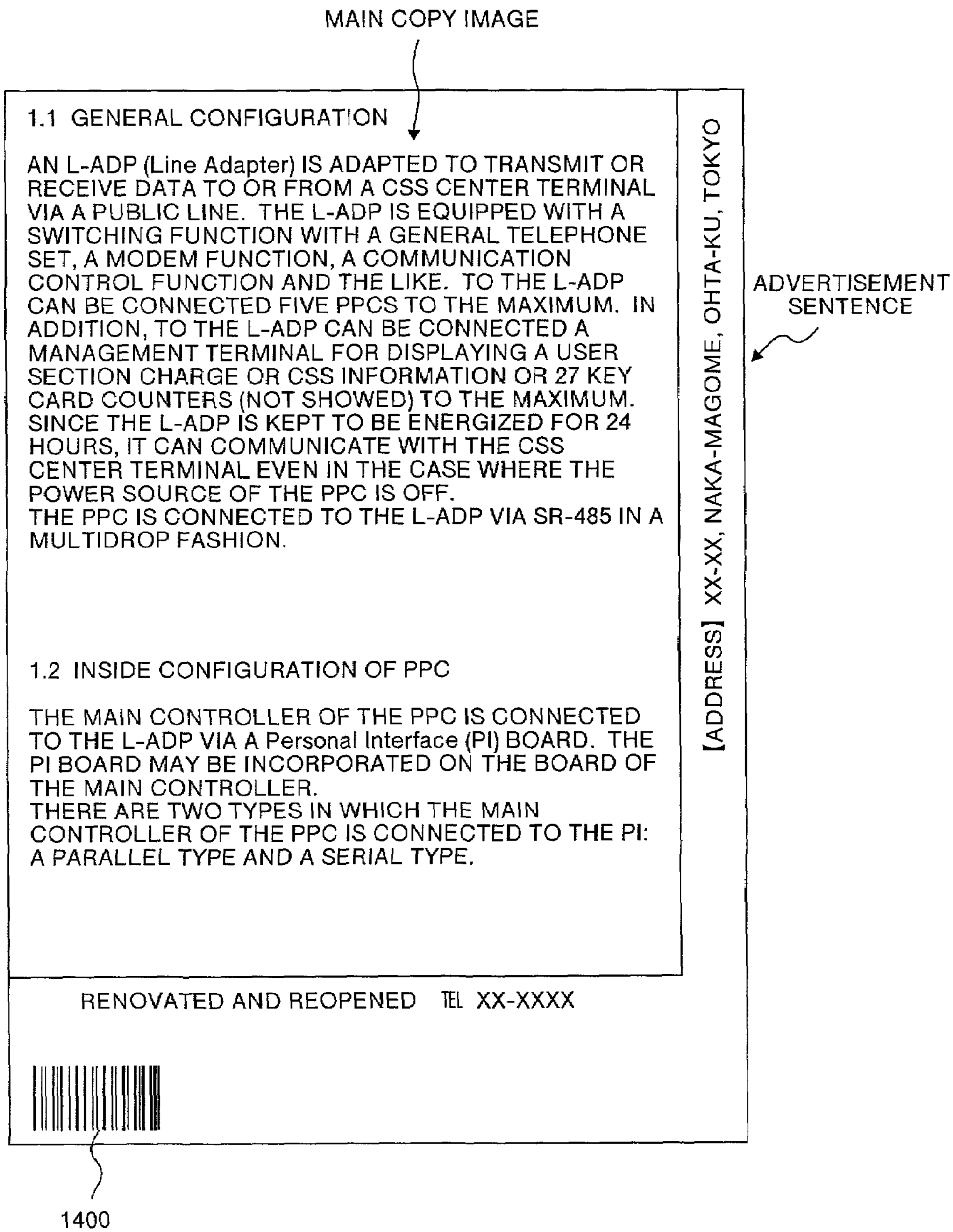
FIG. 14 shows one example in which a bar code is printed together with an advertisement requested to be advertised.

FIG. 14 shows one example in which the bar code is printed together with the advertisement requested to be advertised. As shown in FIG. 14, a part of an advertisement sentence printed at the lower margin of a main copy image is a bar code pattern 1400. A margin at which the bar code pattern 1400 is printed is not limited to the lower margin, but it may be whatever margin of the advertisement sentence.

Figure 15:
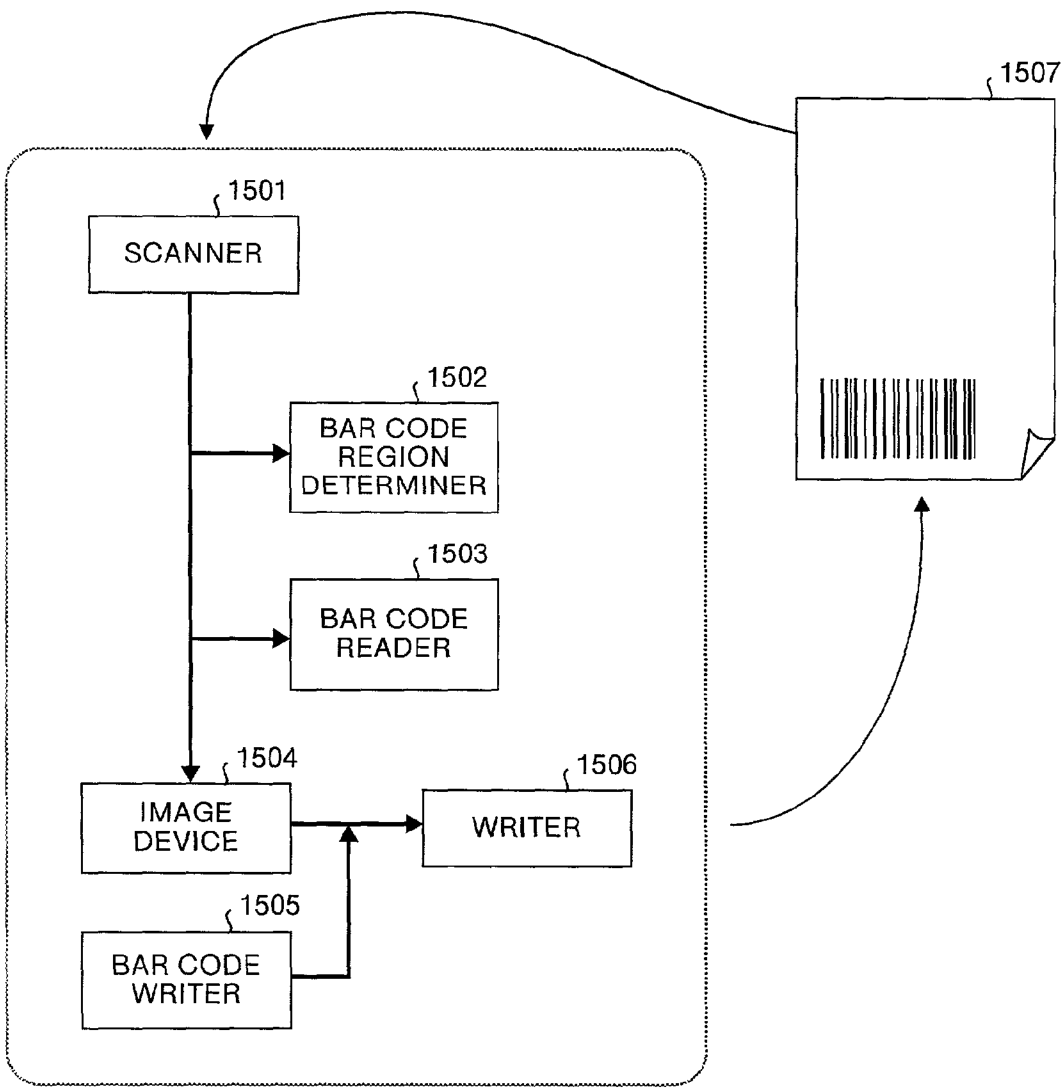
FIG. 15 is a diagram showing a processor for performing the processing associated with the bar code, included in a copying machine.

FIG. 15 is a diagram showing a processor for performing the processing associated with the bar code, included in the copying machine 1130. As shown in FIG. 15, in the copying machine 1130, image data on a document is read by a scanner 1501, and then, is held in an image device 1504, the bar code pattern 1400 is written by a bar code writer 1505, and thus, an image formed by synthesizing the image data with the bar code pattern is written in a printing sheet 1507 by a writer 1506.

Thereafter, when the data on the bar code is transmitted from the copying machine 1130 to the customer managing device 1120, the scanner 1501 reads the printing sheet 1507, a bar code region determiner 1502 determines the region of the bar code, and a bar code reader 1503 reads the bar code from the region, to thus transmit the read bar code to the customer managing device 1120.

In this manner, the use of the bar code enables the read bar code number to be transmitted from not only the copying machine 1130 but also the POS terminal 1140 disposed in a shop possessed by the advertisement client.

This signifies that the advertisement can directly produce an effect since the customer having the printing sheet of the advertisement makes a trip to the shop. Therefore, the direct effect produced by the advertisement can be grasped by managing the read bar code number from the POS terminal 1140.

As described above, the information advertising system in the second embodiment is configured such that the advertisement managing device 1110 allocates the bar code number to the advertisement request upon receipt of the advertisement request from the advertisement client terminal 100, and then, transmits the bar code number to the customer managing device 1120, the customer managing device 1120 delivers the bar code number to the copying machine 1130 together with the advertisement data, the bar code processor 1121 gives the notification of a special discount to the charge managing device 160 based on the read bar code number upon receipt of the read bar code number from the copying machine 1130. Consequently, the effect of the advertisement can be enhanced by the use of the bar code.

Although the first and second embodiments have exemplified the case in which the information is transmitted from the advertisement client to the copying machine in a one-way fashion, the information can be fed back from the copying machine to the advertisement client. In this embodiment, a description will be given of an example in which the information is fed back from the copying machine to the advertisement client.

Figure 16:
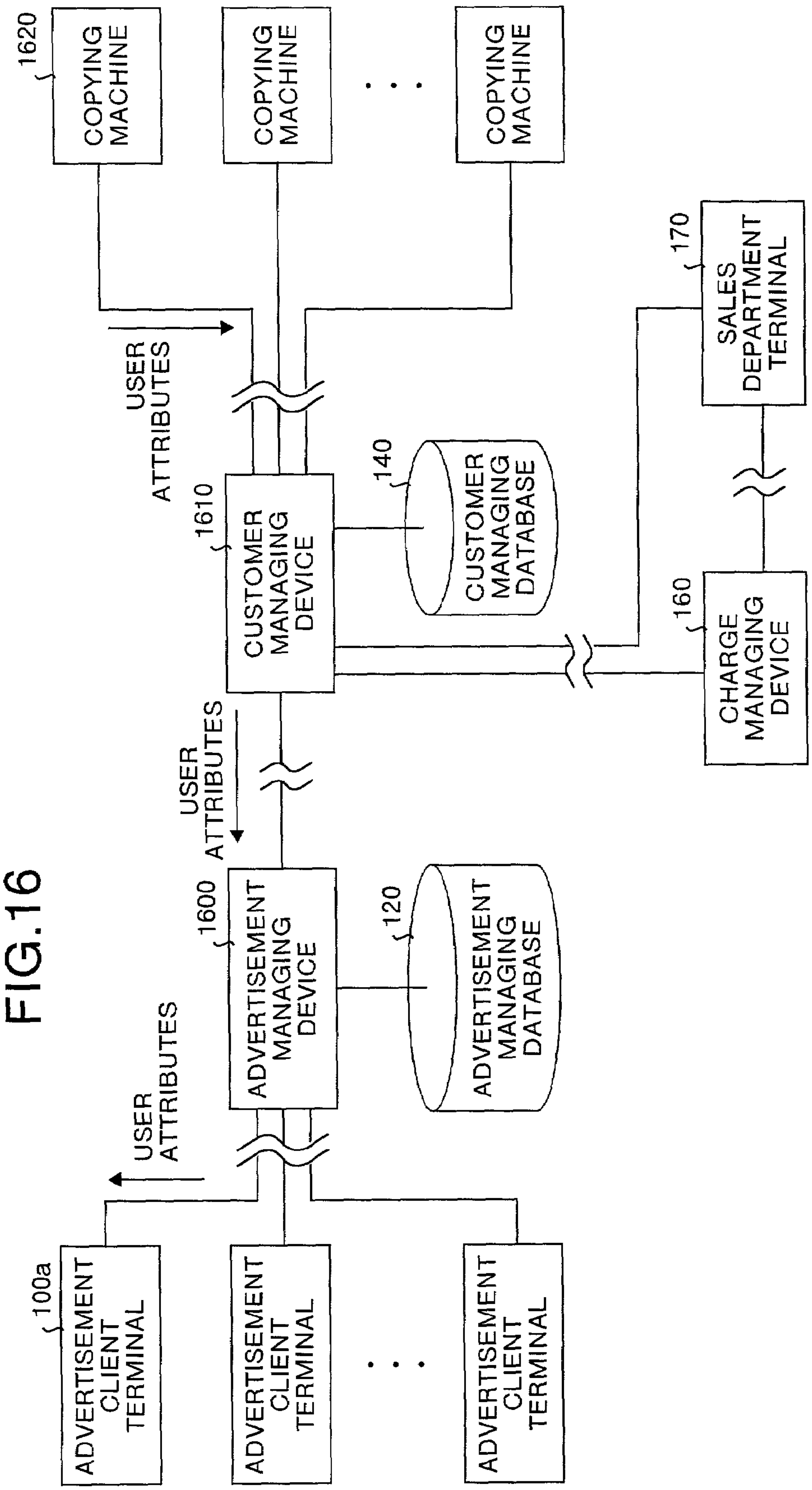
FIG. 16 is a diagram showing the configuration of an information advertising system in a third embodiment.
Figure 17:
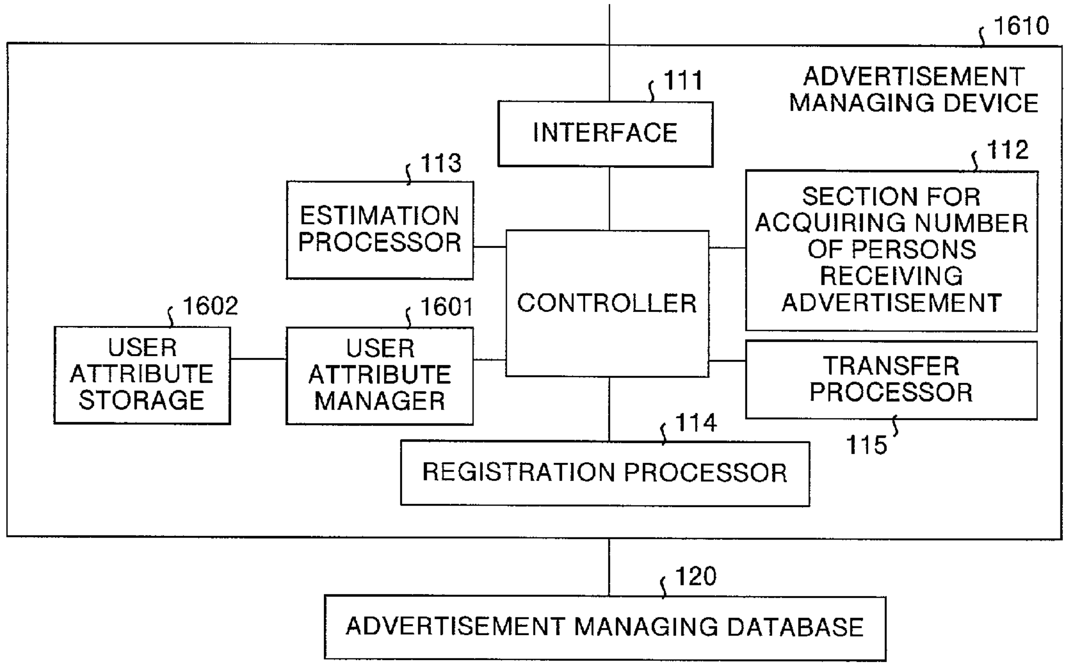
FIG. 17 is a block diagram showing the configuration of an advertisement managing device shown in FIG. 16.
Figure 18:
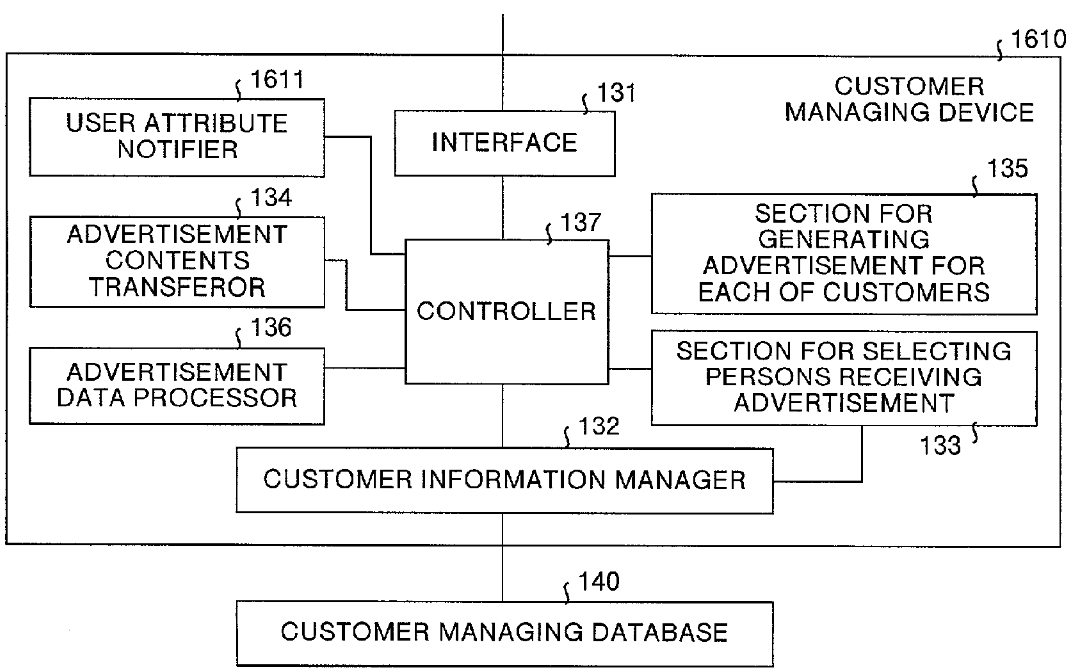
FIG. 18 is a block diagram showing the configuration of a customer managing device shown in FIG. 16.

FIG. 16 is a diagram showing the configuration of an information advertising system in a third embodiment, FIG. 17 is a block diagram showing the configuration of an advertisement managing device 1600 shown in FIG. 16, and FIG. 18 is a block diagram showing the configuration of a customer managing device 1610 shown in FIG. 16. Constituents having the same functions as those of the constituents shown in FIG. 1 to FIG. 3 are designated by the same reference numerals, and therefore, their detailed descriptions will be omitted below.

As shown in FIG. 16, user information inclusive of user needs such as attributes of an advertisement desired to be published is transmitted from a copying machine 1620 to the advertisement managing device 1600 via the customer managing device 1610. The advertisement managing device 1600 collects the user information from each of copying machines 1620, compares the user information with advertisement attributes of an advertisement client held therein, and then, notifies user attributes to a terminal of an advertisement client having the matched attributes. Consequently, each of the advertisement clients can efficiently judge as to what advertisement is desired by what customer, and thus, publishes an advertisement which can fulfill a request from a customer.

Specifically, as shown in FIG. 17, the advertisement managing device 1600 includes a user attribute storage 1602 for storing the user attributes therein and a user attribute manager 1601 for managing the user attributes stored in the user attribute storage 1602, and further, the user information storage 1602 stores therein the user information transmitted from each of the copying machines 1620. The user attribute manager 1601 compares the user attributes with the advertisement attributes of the advertisement client held therein, and then, notifies the user attributes to the terminal of the advertisement client having the matched attributes.

Moreover, as shown in FIG. 18, the customer managing device 1610 includes a user attribute notifier 1611, which acquires the user attributes inclusive of the user needs for an advertisement desired by the user from the copying machine 1620, and then, notifies the user attributes to the advertisement managing device 1600.

As described above, the information advertising system in the third embodiment is configured such that the user attributes inclusive of the user needs for the advertisement desired by the user is notified to the advertisement managing device 1600 from the copying machine 1620 via the customer managing device 1610, and further, the advertisement managing device 1600 compares the user attributes with the attributes of the advertisement client so as to notify it to a suitable advertisement client. Consequently, the customer can get his or her desired advertisement.

Although the copying charge and the advertisement charge managed by the charge managing device 160 are collected by the service person via the sales department terminal 170 in the above-described first to third embodiments, the charges can be charged via a card company.

Figure 19:
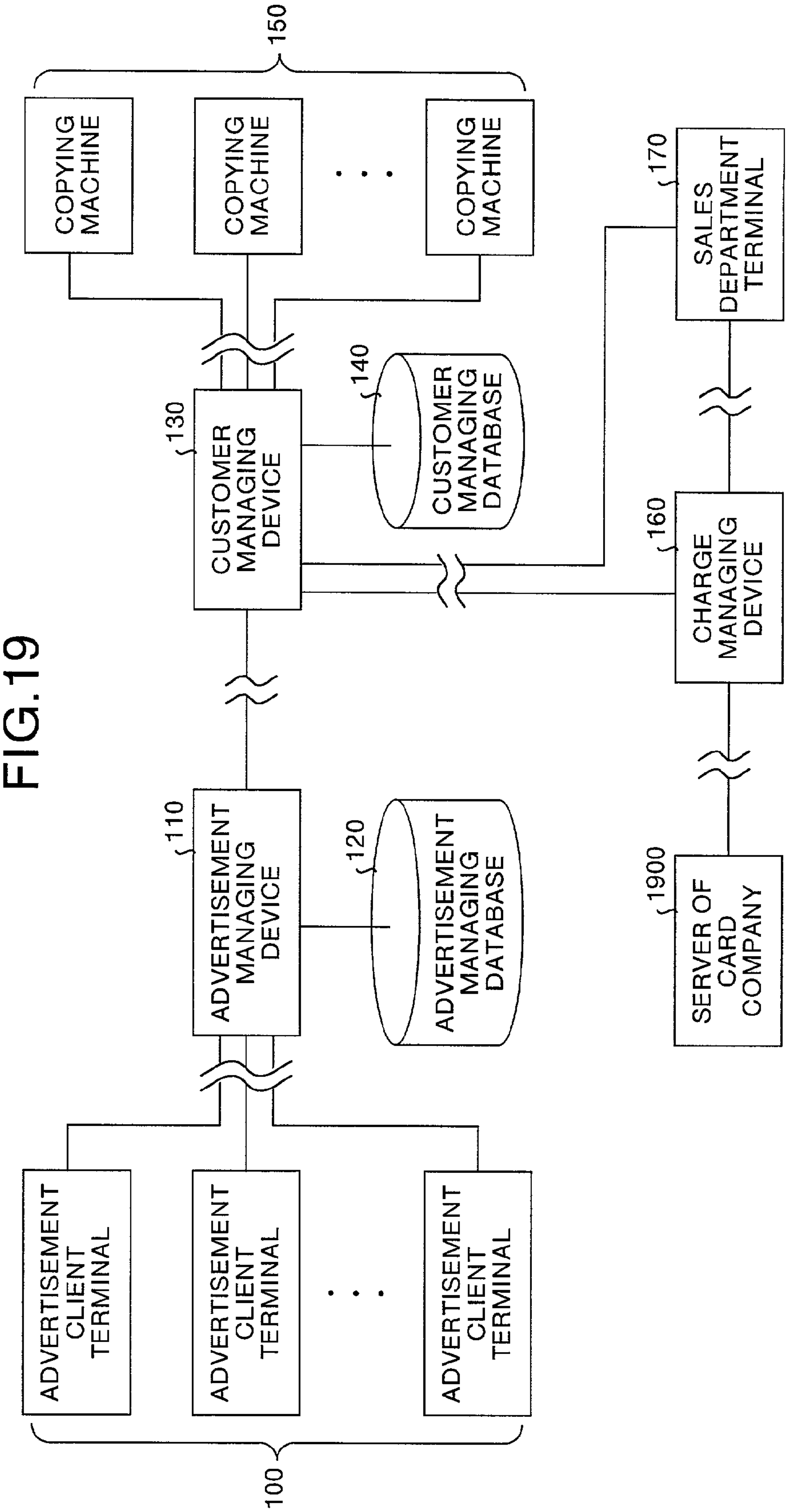
FIG. 19 is a diagram showing the configuration of an information advertising system in a fourth embodiment.

In a fourth embodiment, as shown in FIG. 19, a server 1900 of a card company is connected to a charge managing device 160 via a public line network, and thus, the copying charge and the advertisement charge can be charged via the card company.

Consequently, the card company collects the charges from an advertisement client and a customer in the fourth embodiment, thereby achieving the smooth and efficient collection of the charges.

It has been described in the first to fourth embodiments that the advertisement requested to be advertised by the advertisement client is printed on the printing sheet. However, the present invention is not limited only to this case. That is, the advertisement can be displayed on a console panel of a copying machine.

Figure 20:
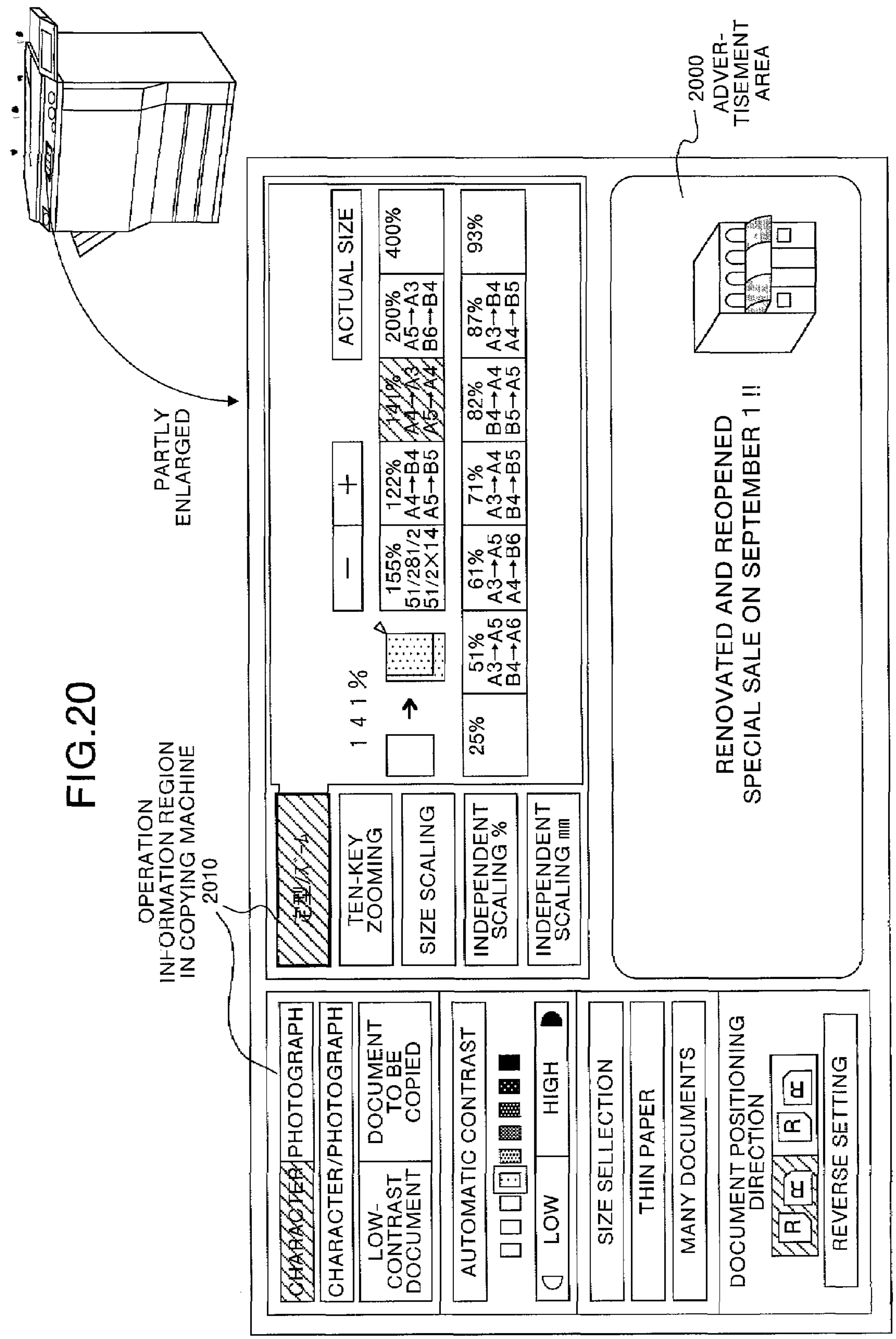
FIG. 20 shows an example in which an advertisement requested to be advertised by an advertisement client is displayed on a console panel of a copying machine.
Figure 21:
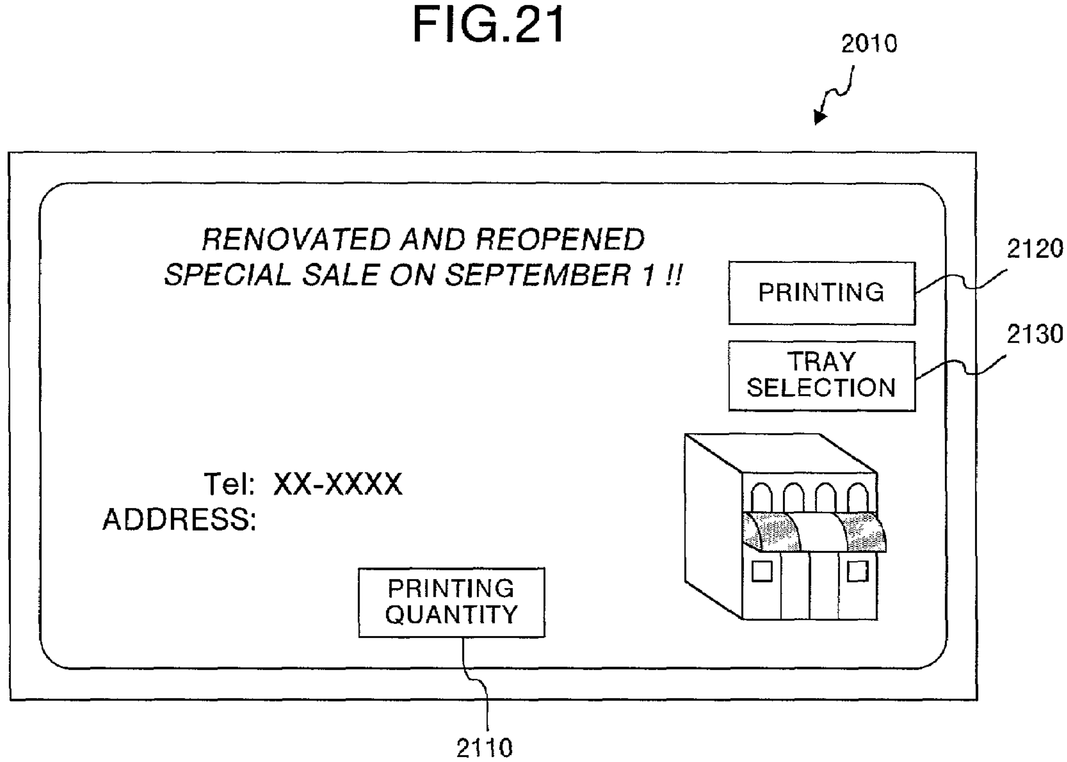
FIG. 21 shows an example in which the advertisement requested to be advertised by the advertisement client is displayed on the console panel of the copying machine.

FIG. 20 and FIG. 21 show an example in which an advertisement requested to be advertised by an advertisement client is displayed on a console panel of a copying machine. As shown in FIG. 20, an advertisement area 2000 is disposed at a part of an operation information region 2010 in the copying machine, so as to display the advertisement requested to be advertised all the time.

Furthermore, as shown in FIG. 21, the advertisement requested to be advertised may be displayed on the entire console panel when the copying machine starts a copying operation. The number of sheets being copied is displayed on a section of the printing number 2110 of sheets shown in FIG. 21. When a button of printing 2120 is operated to be instructed, the advertisement is printed. Moreover, when a button of tray selection 2130 is operated to be instructed, a sheet tray can be changed even during the printing operation.

As described above, the information advertising system in the fifth embodiment is configured such that the advertisement is displayed on the console panel in the copying machine during the printing operation by the copying machine upon receipt of the advertisement request from the advertisement client, thereby allowing the customer to confirm the advertisement even unless the advertisement is printed on the printing sheet.

Although the above-described first to fifth embodiments exemplify the case in which the advertisement managing device and the customer managing device are provided independently of each other, the present invention is not limited to the above-described embodiments, and therefore, both of the managing devices may be integrated with each other. Additionally, the advertisement managing device, the customer managing device and the charge managing device may be integrated into a single managing device.

As described above, according to one aspect of the invention, the information delivering system is configured such that the delivery request for the delivery information is received from the delivery client terminal to be operated by the delivery client requesting for the information, the copying machine adapted to the received delivery request is specified based on the management information accumulated in the managing database, and the delivery information requested to be delivered is transmitted to the specified copying machine, thus producing the effect that there can be provided the information delivering system in which the delivery fulfilling the needs of the delivery client can be speedily offered to the customer with high efficiency by using the system used for remotely managing the copying machine.

Moreover, the information delivering system is configured such that the delivery request including the delivery area, to which at least the delivery contents are delivered, is received, and the copying machine, to which the delivery information is to be transmitted, is specified based on whether or not the installation position of each of the copying machines or the location of the user who uses the copying machine accumulated in the managing database ranges within the delivery area of the delivery request, thus producing the effect that there can be provided the information delivering system in which the copying machine within the delivery area of the delivery intended to be requested by the delivery client can be efficiently specified.

Furthermore, the information delivering system is configured such that the delivery request including the output type indicating whether at least the delivery contents are output in color or monochrome is received, and the output type included in the delivery request is compared with the type of component parts constituting each of the copying machines accumulated in the managing database, so that the copying machine, to which the delivery information is to be transmitted, is specified, thus producing the effect that there can be provided the information delivering system in which the copying machine constituted adaptively to the delivery request, for example, a color copying machine in the case of printing in red, can be efficiently specified.

Moreover, the information delivering system is configured such that the delivery information to be delivered to each of the copying machines is collected per copying machine so as to generate the delivery information for each of the copying machines upon receipt of the delivery request from the plurality of delivery client terminals, and the generated delivery information is transmitted to each of the copying machines, thus producing the effect that there can be provided the information delivering system in which the delivery contents for each of the copying machines can be efficiently transmitted to each of the copying machines even upon receipt of numerous delivery requests having limited conditions.

Furthermore, the information delivering system is configured such that the generated delivery information for each of the copying machines is stored, thus producing the effect that there can be provided the information delivering system in which the delivery request can be speedily sent again even in the case where the delivery contents may be accidentally lost in each of the copying machines.

Moreover, the information delivering system is configured such that the managing device receives the delivery estimation request from the delivery client terminal, acquires the number of copying machines adapted to the estimation request based on the management information accumulated in the managing database, approximates the charge for the information delivery based on the acquired number of copying machines, and returns the estimation result including the charge for the approximated information delivery to the delivery client terminal, thus producing the effect that there can be provided the information delivering system in which the delivery charge can be previously estimated in the case where the delivery charge is collected based on the number of copying sheets including the delivery.

According to an another aspect of the invention, the information delivering system is configured such that the managing device receives the delivery request for the delivery information from the delivery client terminal operated by the delivery client requesting for the information, specifies the copying machine adapted to the received delivery request based on the management information accumulated in the managing database, transmits the delivery information requested to be delivered to the specified copying machine, calculates the delivery charge charged to the delivery client, and charges the calculated delivery charge in addition to the copying charge based on the data relating to the number of copying sheets accumulated in the managing database, thus producing the effect that there can be provided the information delivering system in which the delivery charge can be efficiently charged by using the conventional system for charging the copying charge.

Moreover, the information delivering system is configured such that the delivery charge is calculated based on the cumulative value of the points corresponding to the type or printing portion of the printing sheet, on which the delivery contents are printed by the copying machine, thus producing the effect that there can be provided the information delivering system in which the proper delivery charge can be calculated based on the delivery effect such that the point is low in the case where the used sheets are used, the point is high in the case where the new sheets are used, the point is high in the case where the printing is performed on the cover page and the point is low in the case where the printing is performed on a page other than the cover page.

Furthermore, the information delivering system is configured such that the copying charge is discounted in response to the number of output times including the delivery information by the copying machine, thus producing the effect that there can be provided the information delivering system in which an incentive for the delivery copying can be enhanced since the copying charge per se is reduced as the outputs inclusive of the delivery contents are increased in quantity.

Moreover, the information delivering system is configured such that the copying charge and the delivery charge are transmitted to the server of the card company with which the user of the copying machine and the delivery client contract, and the card company charges the user of the copying machine and the delivery client for the copying charge and the delivery charge received from the managing device, respectively, thus producing the effect that there can be provided the information delivering system in which the charges can be efficiently made by using so-called card payment.

Furthermore, the information delivering system is configured such that the managing device applies the bar code to the delivery request upon receipt of the delivery request from the delivery client terminal, and discounts the copying charge by the copying machine possessed by the user upon receipt of the predetermined bar code information from the copying machine or the POS terminal of the delivery client and the identification information of the user possessing the copying machine, thus producing the effect that there can be provided the information delivering system in which the bar code printed together with the delivery can be positively read, so as to enhance the delivery effect.

Moreover, the information delivering system is configured such that the delivery effect of the delivery request is managed based on the predetermined bar code information received from the copying machine or the POS terminal of the delivery client and the identification information of the customer possessing the copying machine, thus producing the effect that there can be provided the information delivering system in which it is possible to efficiently grasp the delivery effect as to what delivery contents which the customer is interested in.

Furthermore, the information delivering system is configured such that the user attributes of the delivery client received from the copying machine are registered and managed, and the delivery client terminal is notified that the user attributes are registered, thus producing the effect that there can be provided the information delivering system in which the information can be fed back from the copying machine to the delivery client.

Moreover, the information delivering system is configured such that the delivery contents are printed at the margin of the printing sheet when the document is copied on the printing sheet in the case where the copying machine receives the delivery contents from the managing device, thus producing the effect that there can be provided the information delivering system in which the delivery effect can be obtained by directly delivering and printing the delivery contents at the lower margin or the like of the printing sheet.

Furthermore, the information delivering system is configured such that the delivery contents are displayed on the console panel of the copying machine during the document copying operation in the case where the copying machine receives the delivery contents from the managing device, thus producing the effect that there can be provided the information delivering system in which the customer possessing the operative copying machine can grasp the delivery contents in an inoperative time.

According to still another aspect of the invention, the information delivering method is configured such that the delivery request for the delivery information is received from the delivery client terminal to be operated by the delivery client requesting for the information, the copying machine adapted to the received delivery request is specified based on the management information accumulated in the managing database, and the delivery information requested to be delivered is transmitted to the specified copying machine, thus producing the effect that there can be provided the information delivering method in which the delivery fulfilling the needs of the delivery client can be speedily offered to the customer with high efficiency by using the system used for remotely managing the copying machine.

Moreover, the information delivering method is configured such that the delivery request including the delivery area, to which at least the delivery contents are delivered, is received, and the copying machine, to which the delivery information is to be transmitted, is specified based on whether or not the installation position of each of the copying machines or the location of the user who uses the copying machine accumulated in the managing database ranges within the delivery area of the delivery request, thus producing the effect that there can be provided the information delivering method in which the copying machine within the delivery area of the delivery intended to be requested by the delivery client can be efficiently specified.

Furthermore, the information delivering method is configured such that the delivery request including the output type indicating whether at least the delivery contents are output in color or monochrome is received, and the output type included in the delivery request is compared with the type of component parts constituting each of the copying machines accumulated in the managing database so that the copying machine, to which the delivery information is to be transmitted, is specified, thus producing the effect that there can be provided the information delivering method in which the copying machine constituted adaptively to the delivery request, for example, a color copying machine in the case of printing in red, can be efficiently specified.

Moreover, the information delivering method is configured such that the delivery information to be delivered to each of the copying machines is collected per copying machine so as to generate the delivery information for each of the copying machines upon receipt of the delivery request from the plurality of delivery client terminals, and the generated delivery information is transmitted to each of the copying machines, thus producing the effect that there can be provided the information delivering method in which the delivery contents for each of the copying machines can be efficiently transmitted to each of the copying machines even upon receipt of numerous delivery requests having limited conditions.

Furthermore, the information delivering method is configured such that the generated delivery information for each of the copying machines is stored, thus producing the effect that there can be provided the information delivering method in which the delivery request contents can be speedily sent again even in the case where the delivery request contents may be accidentally lost in each of the copying machines.

Moreover, the information delivering method is configured such that the managing device receives the delivery estimation request from the delivery client terminal, acquires the number of copying machines adapted to the estimation request based on the management information accumulated in the managing database, approximates the charge for the information delivery based on the acquired number of copying machines, and returns the estimation result including the charge for the approximated information delivery to the delivery client terminal, thus producing the effect that there can be provided the information delivering method in which the delivery charge can be previously estimated in the case where the delivery charge is collected based on the number of copying sheets including the delivery.

According to still another aspect of the invention, the information delivering method is configured such that the managing device receives the delivery request for the delivery information from the delivery client terminal operated by the delivery client requesting for the information, specifies the copying machine adapted to the received delivery request based on the management information accumulated in the managing database, transmits the delivery information requested to be delivered to the specified copying machine, calculates the delivery charge charged to the delivery client, and charges the calculated delivery charge in addition to the copying charge based on the data relating to the number of copying sheets accumulated in the managing database, thus producing the effect that there can be provided the information delivering method in which the delivery charge can be efficiently charged by using the conventional system for charging the copying charge.

Moreover, the information delivering method is configured such that the delivery charge is calculated based on the cumulative value of the points corresponding to the type or printing portion of the printing sheet, on which the delivery contents are printed by the copying machine, thus producing the effect that there can be provided the information delivering method in which the proper delivery charge can be calculated based on the delivery effect such that the point is low in the case where the used sheets are used, the point is high in the case where the new sheets are used, the point is high in the case where the printing is performed on the cover page and the point is low in the case where the printing is performed on a page other than the cover page.

Furthermore, the information delivering method is configured such that the copying charge is discounted in response to the number of output times including the delivery information by the copying machine, thus producing the effect that there can be provided the information delivering method in which an incentive for the delivery copying can be enhanced since the copying charge per se is reduced as the outputs inclusive of the delivery contents are increased in quantity.

Moreover, the information delivering method is configured such that the copying charge and the delivery charge are transmitted to the server of the card company with which the user of the copying machine and the delivery client contract, and the card company charges the user of the copying machine and the delivery client for the copying charge and the delivery charge received from the managing device, respectively, thus producing the effect that there can be provided the information delivering method in which the charges can be efficiently made by using so-called card payment.

Furthermore, the information delivering method is configured such that the managing device applies the bar code to the delivery request upon receipt of the delivery request from the delivery client terminal, and discounts the copying charge by the copying machine possessed by the user upon receipt of the predetermined bar code information from the copying machine or the POS terminal of the delivery client and the identification information of the user possessing the copying machine, thus producing the effect that there can be provided the information delivering method in which the bar code printed together with the delivery can be positively read, so as to enhance the delivery effect.

Moreover, the information delivering method is configured such that the delivery effect of the delivery request is managed based on the predetermined bar code information received from the copying machine or the POS terminal of the delivery client and the identification information of the customer possessing the copying machine, thus producing the effect that there can be provided the information delivering method in which it is possible to efficiently grasp the delivery effect as to what delivery contents which the customer is interested in.

Furthermore, the information delivering method is configured such that the user attributes of the delivery client received from the copying machine are registered and managed, and the delivery client terminal is notified that the user attributes are registered, thus producing the effect that there can be provided the information delivering method in which the information can be fed back from the copying machine to the delivery client.

Moreover, the information delivering method is configured such that the delivery contents are printed at the margin of the printing sheet when the document is copied on the printing sheet in the case where the copying machine receives the delivery contents from the managing device, thus producing the effect that there can be provided the information delivering method in which the delivery effect can be obtained by directly delivering and printing the delivery contents at the lower margin or the like of the printing sheet.

Furthermore, the information delivering method is configured such that the delivery contents are displayed on the console panel of the copying machine during the document copying operation in the case where the copying machine receives the delivery contents from the managing device, thus producing the effect that there can be provided the information delivering method in which the customer possessing the operative copying machine can grasp the delivery contents in an inoperative time.

According to still another aspect of the invention, the program can become machine-readable by recording the program enabling the computer to execute the method according to any one of the sixteenth to thirtieth aspects, thus producing the effect that there can be provided the recording medium in which the operation according to any one of the sixteenth to thirtieth aspects can be implemented by the computer.

The present document incorporates by reference the entire contents of Japanese priority document, 2000-356641 filed in Japan on Nov. 22, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information delivering system comprising:

a plurality of copying machines and a managing device for managing the copying machines by the use of a managing database accumulating therein management information on each of the copying machines and outputs delivery information delivered from the managing device from the copying machine, wherein the managing device includes a delivery request receiving unit which receives a delivery request for the delivery information from a delivery client terminal operated by an information delivery client;

a specifying unit which specifies the copying machine adapted to the delivery request received by the delivery request receiving unit based on the management information accumulated in the managing database; and a delivery information transmitting unit which transmits the delivery information requested to be delivered to the copying machine specified by the specifying unit.

2. The information delivering system according to claim 1, wherein the managing database accumulates therein, as the management information, the installation position of each of the copying machines or the location of a user who uses the copying machine, the delivery request receiving unit receives the delivery request including a delivery area to which at least the delivery contents are delivered, and the specifying unit specifies the copying machine to which the delivery information is to be transmitted based on whether or not the installation position of each of the copying machines or the location of the user who uses the copying machine accumulated in the managing database ranges within the delivery area of the delivery request.

3. The information delivering system according to claim 1, wherein the managing database accumulates therein, as the management information, the type of component parts constituting each of the copying machines, the delivery request receiving unit receives the delivery request including an output type indicating whether at least the delivery contents are output in color or monochrome, and the specifying unit compares the output type included in the delivery request with the type of component parts constituting each of the copying machines accumulated in the managing database so as to specify the copying machine to which the delivery information is to be transmitted.

4. The information delivering system according to claim 1, wherein the managing device further comprises a delivery information generating unit which collects the delivery information to be delivered to each of the copying machines specified by the specifying unit per copying machine so as to generate the delivery information for each of the copying machines upon receipt of the delivery request from the plurality of delivery client terminals, the delivery information transmitting unit transmitting the delivery information generated by the delivery information generating unit to each of the copying machines specified by the specifying unit.

5. The information delivering system according to claim 4, wherein the managing device further comprises a delivery information storing unit which stores therein the delivery information for each of the copying machines generated by the delivery information generating unit.

6. The information delivering system according to claim 1, wherein the managing device further comprises: an estimation request receiving unit which receives a delivery estimation request from the delivery client terminal; an acquiring unit which acquires the number of copying machines adapted to the estimation request received by the estimation request receiving unit based on the management information accumulated in the managing database; an approximating unit which approximates a charge for the information delivery based on the number of copying machines acquired by the acquiring unit; and an estimation result returning unit which returns an estimation result including the charge for the information delivery approximated by the approximating unit to the delivery client terminal.

7. The information delivering system according to claim 1, wherein the copying machine prints the delivery information at the margin of the printing sheet when a document is copied on the printing sheet in the case where the copying machine receives the delivery information from the managing device.

8. The information delivering system according to claim 1, wherein the copying machine displays the delivery information on a console panel of the copying machine during a document copying operation in the case where the copying machine receives the delivery information from the managing device.

9. An information delivering system comprising:

a plurality of copying machines and a managing device for managing the copying machines by the use of a managing database accumulating therein management information on each of the copying machines and outputs delivery information delivered from the managing device from the copying machine, wherein the managing device includes a delivery request receiving unit which receives a delivery request for the delivery information from a delivery client terminal operated by an information delivery client;

a specifying unit which specifies the copying machine adapted to the delivery request received by the delivery request receiving unit based on the management information accumulated in the managing database;

a delivery information transmitting unit which transmits the delivery information requested to be delivered to the copying machine specified by the specifying unit; and a user attribute managing unit which registers and managing user attributes of the delivery client received from the copying machine; and a registration notifying unit which notifies the delivery client terminal that the user attributes are registered in the user attribute managing unit.

10. The information delivering system according to claim 9, wherein the managing database accumulates therein, as the management information, the installation position of each of the copying machines or the location of a user who uses the copying machine, the delivery request receiving unit receives the delivery request including a delivery area to which at least the delivery contents are delivered, and the specifying unit specifies the copying machine to which the delivery information is to be transmitted based on whether or not the installation position of each of the copying machines or the location of the user who uses the copying machine accumulated in the managing database ranges within the delivery area of the delivery request.

11. The information delivering system according to claim 9, wherein the managing database accumulates therein, as the management information, the type of component parts constituting each of the copying machines, the delivery request receiving unit receives the delivery request including an output type indicating whether at least the delivery contents are output in color or monochrome, and the specifying unit compares the output type included in the delivery request with the type of component parts constituting each of the copying machines accumulated in the managing database so as to specify the copying machine to which the delivery information is to be transmitted.

12. The information delivering system according to claim 9, wherein the managing device further comprises a delivery information generating unit which collects the delivery information to be delivered to each of the copying machines specified by the specifying unit per copying machine so as to generate the delivery information for each of the copying machines upon receipt of the delivery request from the plurality of delivery client terminals, the delivery information transmitting unit transmitting the delivery information generated by the delivery information generating unit to each of the copying machines specified by the specifying unit.

13. The information delivering system according to claim 12, wherein the managing device further comprises a delivery information storing unit which stores therein the delivery information for each of the copying machines generated by the delivery information generating unit.

14. The information delivering system according to claim 9, wherein the managing device further comprises: an estimation request receiving unit which receives a delivery estimation request from the delivery client terminal; an acquiring unit which acquires the number of copying machines adapted to the estimation request received by the estimation request receiving unit based on the management information accumulated in the managing database; an approximating unit which approximates a charge for the information delivery based on the number of copying machines acquired by the acquiring unit; and an estimation result returning unit which returns an estimation result including the charge for the information delivery approximated by the approximating unit to the delivery client terminal.

15. The information delivering system according to claim 9, wherein the copying machine prints the delivery information at the margin of the printing sheet when a document is copied on the printing sheet in the case where the copying machine receives the delivery information from the managing device.

16. The information delivering system according to claim 9, wherein the copying machine displays the delivery information on a console panel of the copying machine during a document copying operation in the case where the copying machine receives the delivery information from the managing device.

* * * * *